(12) United States Patent
Foo et al.

(10) Patent No.: US 9,650,006 B2
(45) Date of Patent: May 16, 2017

(54) METHOD AND APPARATUS FOR CONTROLLING AN ACTUATABLE RESTRAINING DEVICE USING MULTI-REGION ENHANCED DISCRIMINATION

(71) Applicant: TRW AUTOMOTIVE U.S. LLC, Livonia, MI (US)

(72) Inventors: Chek-peng Foo, Ann Arbor, MI (US); Huahn-fern Yeh, Novi, MI (US); Paul Leo Sumner, Farmington Hills, MI (US); Raymond David, Dearborn Heights, MI (US); Kevin Daniel Weiss, Royal Oak, MI (US); Lila Ghannam, Northville, MI (US); Mengfu Tsai, Ann Arbor, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 14/437,083

(22) PCT Filed: Dec. 3, 2013

(86) PCT No.: PCT/US2013/072785
§ 371 (c)(1),
(2) Date: Apr. 20, 2015

(87) PCT Pub. No.: WO2014/089026
PCT Pub. Date: Jun. 12, 2014

(65) Prior Publication Data
US 2015/0266439 A1 Sep. 24, 2015

Related U.S. Application Data

(60) Provisional application No. 61/734,129, filed on Dec. 6, 2012.

(51) Int. Cl.
*B60R 21/0132* (2006.01)
*B60R 21/01* (2006.01)

(52) U.S. Cl.
CPC ... *B60R 21/0132* (2013.01); *B60R 2021/0119* (2013.01)

(58) Field of Classification Search
CPC ......... B60R 21/0132; B60R 2021/0119; B60R 21/0134; B60R 2012/0004; H01M 2/18
(Continued)

(56) References Cited

U.S. PATENT DOCUMENTS 6,170,864 B1    1/2001  Fujita et al.
7,147,246 B2 *  12/2006 Breed ................. B60R 21/0152
                                                                280/735

(Continued)

FOREIGN PATENT DOCUMENTS

GB       2436692      10/2007
WO    2011069939       6/2011

OTHER PUBLICATIONS

PCT/US13/72785 International Search Report and Written Opinion, completed Apr. 27, 2014.

*Primary Examiner* — McDieunel Marc
(74) *Attorney, Agent, or Firm* — Tarolli, Sundheim, Covell & Tummino LLP

(57) ABSTRACT

A method for controlling an actuatable restraining device includes sensing a plurality of crash event indications, classifying crash events in response to the sensed crash event indications to identify at least one of a forward rigid barrier crash event, an offset deformable barrier crash event, an angular crash event, and a small overlap crash event, and controlling deployment timing of the actuatable restraining device in response to the classification of the crash event.

28 Claims, 23 Drawing Sheets

(58) Field of Classification Search
USPC .................. 705/45; 429/143, 147; 280/735; 180/271
See application file for complete search history.

(56) References Cited

U.S. PATENT DOCUMENTS

| | | | | |
|---|---|---|---|---|
| 7,164,117 | B2 * | 1/2007 | Breed | ............... B60R 21/01516 250/208.1 |
| 7,243,945 | B2 * | 7/2007 | Breed | .................. B60N 2/002 180/274 |
| 7,407,029 | B2 * | 8/2008 | Breed | .................. B60N 2/002 180/173 |
| 7,415,126 | B2 * | 8/2008 | Breed | ...................... B60J 10/00 382/100 |
| 7,663,502 | B2 * | 2/2010 | Breed | .................... B60C 11/24 340/12.25 |
| 7,983,817 | B2 * | 7/2011 | Breed | .................. B60N 2/002 250/578.1 |
| 2006/0095183 | A1 | 5/2006 | Schuller | |
| 2007/0228704 | A1 | 10/2007 | Cuddihy et al. | |
| 2009/0099733 | A1 | 4/2009 | Theisen | |
| 2010/0292887 | A1 | 11/2010 | Becker et al. | |
| 2015/0343977 | A1 | 12/2015 | Jeong | |

* cited by examiner

| | (1) HS_FRB Misuse Box | (2) Small-Overlap Misuse Box | (3) PT Switch Misuse Box | (4) Airbag Switch Misuse Box | (5) LBX_RelVel -ACU_X Switch Threshold | (6) RBX_RelVel -ACU_X Switch Threshold | (7) LBX_AMA -ACU_X Switch Threshold | (8) RBX_AMA -ACU_X Switch Threshold | (9) LCZSX- ACU_X Switch Threshold | (10) RCZSX- ACU_X Switch Threshold | (11) PT Switch V-Sensor Threshold | (12) Airbag Switch V-Sensor Threshold | (13) Normal Misuse Boxes & Thresholds |
|---|---|---|---|---|---|---|---|---|---|---|---|---|---|
| No M-RED_8 Action 159 | ✗ | ✗ | N-3 | N-4 | ✗ | ✗ | N-7 | N-8 | N-9 | N-10 | N-11 | N-12 | N-13 |
| M-RED_8 Symmetric Action 161 | S-1 | ✗ | S-3 | S-4 | ✗ | ✗ | S-7 | S-8 | S-9 | S-10 | S-11 | S-12 | S-13 |
| M-RED_8 Left Asymmetric Action 169 | ✗ | ✗ | L-3 | L-4 | ✗ | ✗ | L-7 | L-8 | L-9 | L-10 | L-11 | L-12 | L-13 |
| M-RED_8 Right Asymmetric Action 179 | ✗ | ✗ | R-3 | R-4 | ✗ | ✗ | R-7 | R-8 | R-9 | R-10 | R-11 | R-12 | R-13 |
| M-RED_8 Left Small-Overlap Action 181 | ✗ | L-2 | L-3 | L-4 | C-L5 | ✗ | L-7 | L-8 | L-9 | L-10 | L-11 | L-12 | L-13 |
| M-RED_8 Left Angular Action 187 | ✗ | ✗ | L-3 | L-4 | C-L5 | ✗ | L-7 | L-8 | L-9 | L-10 | L-11 | L-12 | L-13 |
| M-RED_8 Left ODB Action 189 | ✗ | ✗ | L-3 | L-4 | C-L5 | ✗ | L-7 | L-8 | L-9 | L-10 | L-11 | L-12 | L-13 |
| No M-RED_8 Left Asymmetric Action 120 or 130 | ✗ | ✗ | N-3 | N-4 | ✗ | ✗ | N-7 | N-8 | N-9 | N-10 | N-11 | N-12 | N-13 |
| M-RED_8 Right Small-Overlap Action 191 | ✗ | R-2 | R-3 | R-4 | ✗ | C-R6 | R-7 | R-8 | R-9 | R-10 | R-11 | R-12 | R-13 |
| M-RED_8 Right Angular Action 197 | ✗ | ✗ | R-3 | R-4 | ✗ | C-R6 | R-7 | R-8 | R-9 | R-10 | R-11 | R-12 | R-13 |
| M-RED_8 Right ODB Action 199 | ✗ | ✗ | R-3 | R-4 | ✗ | C-R6 | R-7 | R-8 | R-9 | R-10 | R-11 | R-12 | R-11 |
| No M-RED_8 Right Asymmetric Action 140 or 150 | ✗ | ✗ | N-3 | N-4 | ✗ | ✗ | N-7 | N-8 | N-9 | N-10 | N-11 | N-10 | N-11 |

METHOD AND APPARATUS FOR CONTROLLING AN ACTUATABLE RESTRAINING DEVICE USING MULTI-REGION ENHANCED DISCRIMINATION

CROSS REFERENCES TO RELATED APPLICATIONS

This application filed under 35 U.S.C §371 is a national phase application of International Application Ser. Number PCT/US2013/072785 filed Dec. 3, 2013, which claims priority to U.S. Provisional Application 61/734,129, filed Dec. 6, 2012.

FIELD OF THE INVENTION

The present invention relates to a method and apparatus for controlling a vehicle actuatable occupant restraining device, and, in particular, to an enhanced discrimination method and apparatus for determining particular vehicle events. The enhanced discrimination method and apparatus of the present invention provides multi-region enhanced discrimination of vehicle crash events using an event classification arrangement that can discriminate a high speed frontal rigid barrier impact event, an offset deformable barrier impact event, an oblique/angular frontal rigid barrier impact event, and a small/narrow overlap impact event. This enhanced discrimination method and apparatus is used to control an actuatable occupant restraining device in a vehicle.

BACKGROUND OF THE INVENTION

Actuatable occupant restraining systems for use in vehicles are known in the art. Modern actuatable restraining systems often include a plurality of sensors, such as accelerometers, and an electronic control unit ("ECU") that monitors the sensors. The ECU makes a determination, based on the signals from the sensors, if the restraining system should be actuated (e.g., a seat belt pretensioner activated, an airbag deployed, etc.). In early actuatable restraining systems, mechanical sensor switches were used for deployment control. Later, other types of crash sensor were used such as accelerometers. The simplest example of such a restraining system using an accelerometer used the accelerometer for measuring crash acceleration as a function of time. A controller monitored the output signal of the accelerometer and determined if the crash acceleration as a function of time was greater than a predetermined value, and, if so, the restraint was actuated.

Occupant actuatable restraining systems including their sensor arrangements and discrimination algorithms have become more complex in an attempt to better discriminate between, what is referred to as, deployment and non-deployment vehicle crash events. In particular, systems have been developed to "catch" certain vehicle events, e.g., high speed non-deformable barrier crash, for which it is desired to actuate the restraint system (i.e., a deployment crash event) and to "filter out" or "not catch" other vehicle events, e.g., undercarriage snag, for which it is not desired to actuate the restraint system (i.e., a non-deployment crash event"). Complicating the issue further is that such determination schemes are vehicle platform dependent. What may work to catch or filter out certain vehicle events on one particular vehicle platform may not work on another vehicle platform. It should also be noted that vehicle events, whether deployment or non-deployment events, are all referred to herein as "vehicle crash events", even though the event may not be a "crash" as may be commonly understood. For example, an undercarriage snag is referred to as a non-deployment vehicle crash event even though an undercarriage snag is not considered a crash in its normal meaning.

Several patents have been issued describing methods and apparatuses for discriminating between deployment and non-deployment crash events. For example, U.S. Pat. No. 6,776,435 to Foo et al., assigned to TRW Inc., discloses a method and apparatus for controlling an actuatable restraining device using switched thresholds based on use of a crush zone sensor. U.S. Pat. No. 7,359,781 to Foo et al., assigned to TRW Automotive U.S. LLC, discloses a method and apparatus for determining symmetric and asymmetric crash events with improved misuse margins. U.S. Pat. No. 7,625,006 to Foo et al., assigned to TRW Automotive U.S. LLC, discloses a method and apparatus for controlling an actuatable restraining device using crush zone sensors for a safing function. U.S. Pat. No. 8,118,130 to Foo et al., assigned to TRW Automotive U.S. LLC, discloses a method and apparatus for controlling an actuatable restraining device using XY crush zone satellite accelerometers, i.e., multi-axis sensors. The teachings of each of these Foo et al. patents are hereby incorporated herein in their entirety.

SUMMARY OF THE INVENTION

In accordance with the present invention, remote side multi-axis satellite sensors ("MAS") are located in the vehicle's B-Pillar and crush zone MAS crush zone sensors ("CZS") are located at the front of the vehicle in the vehicle's crush zone. Also, in accordance with the present invention, a unique evaluation process is provided to enhance crash discrimination for particular vehicle events using a novel crash classification arrangement. More specifically, the present invention provides a controller that monitors the remote located side MAS sensors and the MAS CZS sensors and performs an event classification analysis to enhanced discrimination by determining particular events including (1) a high speed frontal rigid barrier impact event, (2) an offset deformable barrier impact event (e.g., a crash event involving a 40% overlap with a deformable barrier), (3) an oblique/angular frontal rigid barrier impact event, and (4) a small/narrow overlap impact event (e.g., a crash event involving a 25% overlap typically with a rigid barrier). When such an event is determined to be occurring, a base deployment control algorithm is adjusted to provide a quicker actuation of the restraining device(s).

The small/narrow overlap impact event is a new crash test that is being conducted on vehicles by the Insurance Institute of Highway Safety ("IIHS"). Also, the U.S. New Car Assessment Program ("US NCAP") has also instituted a new test for a 5% 56-kph frontal rigid barrier ("FRB") crash event. Prior art actuatable restraining control arrangements have not provided an adequate analysis of these particular new types of crash events now being used in vehicle crash worthiness evaluations. The present invention provides a better assessment and discrimination of these particular events and deployment results by providing:

(1) A very fast decision/sensing time (time to fire "TTF") for frontal airbags and pretensioners (in the range of 5 ms to 10 ms) for 56-kph FRB & Small/Narrow Overlap Impact events;

(2) A robust and well controlled must-deploy decision of Side Curtain Airbags for Small Overlap impact events, Oblique/Angular, and offset deformable barrier ("ODB") events and a no-deploy decision of the Curtain Airbag for a 56-kph FRB event;
(3) An improved deployment decision timing for ODB impact events; and
(4) Improve control of the Seat-belt Load Limiters for all high severity impact events.

In accordance with one example embodiment of the present invention, a method is provided for controlling an actuatable restraining device comprising the steps of sensing a plurality of crash event indications, classifying crash events in response to the sensed crash event indications to identify at least one of a forward rigid barrier crash event, an offset deformable barrier crash event, an angular crash event, and a small overlap crash event, and controlling deployment timing of the actuatable restraining device in response to the classification of the crash event.

In accordance with another example embodiment of the present invention, a method is provided for controlling an actuatable restraining device comprising the steps of sensing a plurality of crash event indications, classifying crash events in response to the sensed crash event indications to identify a small overlap crash event, and controlling deployment timing of the actuatable restraining device in response to the classification of the crash event.

In accordance with yet another embodiment of the present invention a method is provided for controlling an actuatable restraining device comprising the steps of sensing a plurality of crash event indications, classifying crash events in response to the sensed crash event indications, and controlling deployment timing of the actuatable restraining device in response to the classification of the crash event using a base deployment control algorithm and an enhanced deployment algorithm wherein the enhanced deployment algorithm monitors for a small overlap crash event.

In accordance with another example embodiment of the present invention, an apparatus is provided for controlling an actuatable restraining device comprising a plurality of sensors for sensing a plurality of crash event indications; and a controller for classifying crash events in response to the sensed crash event indications to identify at least one of a forward rigid barrier crash event, an offset deformable barrier crash event, an angular crash event, and a small overlap crash event and controlling deployment timing of the actuatable restraining device in response to the classification of the crash event.

In accordance with another example embodiment of the present invention, an apparatus is provided for controlling an actuatable restraining device comprising a plurality of sensors for sensing a plurality of crash event indications, and a controller for classifying crash events in response to the sensed crash event indications to identify a small overlap crash event and controlling deployment timing of the actuatable restraining device in response to the classification of the crash event.

BRIEF DESCRIPTION OF THE DRAWINGS

The foregoing and other features and advantages of the invention will become apparent to one skilled in the art upon consideration of the following description of the invention and the accompanying drawings in which:

FIG. 14 shows a logic control switch table using the logic control switch condition values from FIGS. 10-13 in accordance with an example embodiment of the present invention;

DETAILED DESCRIPTION

Figure 1:
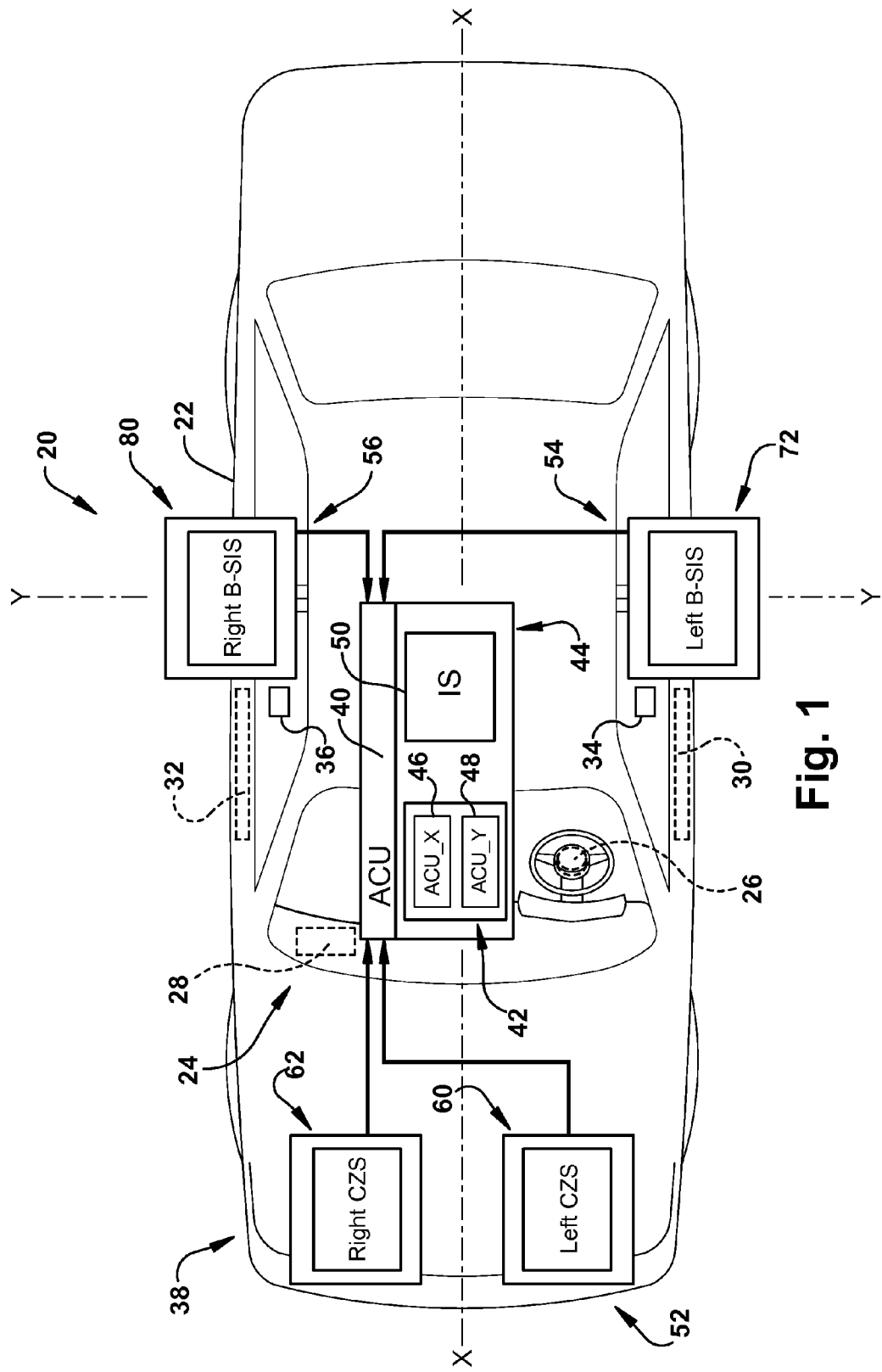
FIGS. 1 and 2 are schematic diagrams showing the sensor architecture for a vehicle actuatable occupant restraining system made in accordance with an example embodiment of the present invention.
Figure 2:
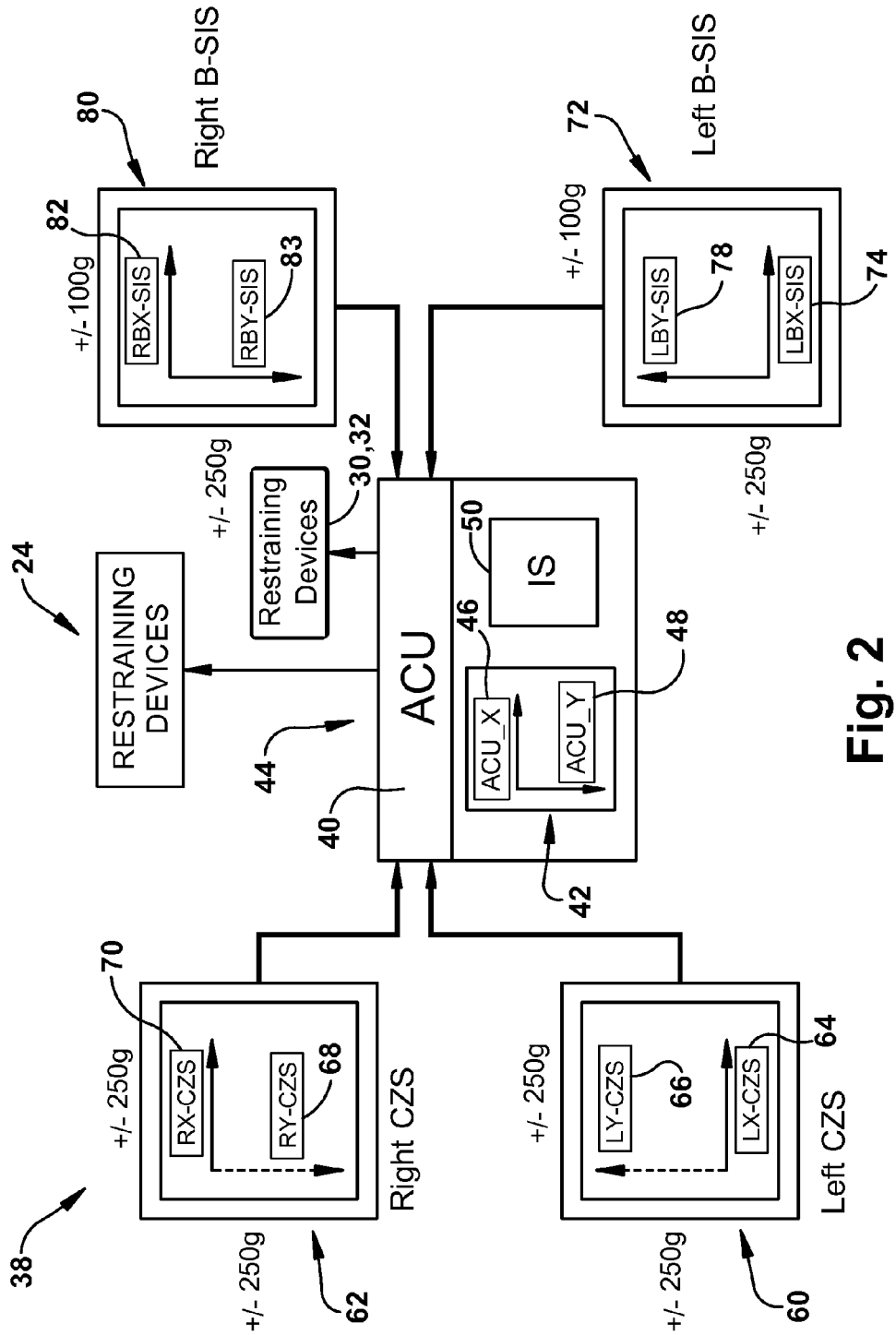

Referring to FIGS. 1 and 2, an actuatable occupant restraining system 20 in a vehicle 22, in accordance with one example embodiment of the present invention, provides multi-region enhanced discrimination of a high speed frontal rigid barrier impact event, an offset deformable barrier impact event, an oblique/angular frontal rigid barrier impact event, and a small/narrow overlap impact event for the control of an actuatable occupant restraining device such as an airbag. The system 20 includes a plurality of actuatable restraining devices 24 such as a driver's side, front actuatable restraining device 26, a passenger's side, front actuatable restraining device 28, a driver's side seat belt pretensioner 34, and a passenger's side seat belt pretensioner 36. The actuatable occupant restraining system 20 further includes a driver's actuatable side restraining device such as an air curtain 30 and a passenger's actuatable side restraining device such as an air curtain 32. Other actuatable restraining devices could be provided.

The system 20 further includes a plurality of vehicle crash event sensors 38 connected to an airbag control unit ("ACU") 40. The vehicle crash event sensors 38 include a central group of crash event sensors 42. The ACU 40 and the central event sensors 42 can be housed in a single central module 44. The ACU 40 is, in accordance with one example embodiment of the present invention, a microcontroller but could be an application specific integrated circuit ("ASIC") designed to perform the functions described below. As described in detail below, the ACU 40 monitors the signals output from the event sensors 38 and is connect to the retraining devices 24, and restraining devices 30, 32 to control the restraining devices in response to the event sensor signals according to the present invention.

The central event sensors 42 include a first crash acceleration sensor 46 having its axis of sensitivity substantially oriented to sense crash acceleration in the vehicle X-direction (i.e., parallel with the front-to-rear axis of the vehicle) and provides a crash acceleration signal designated ACU_X. The central event sensors 42 further include a second crash acceleration sensor 48 having its axis of sensitivity substantially oriented to sense crash acceleration in the vehicle Y-direction (i.e., substantially perpendicular to the front-to-rear axis of the vehicle) and provides a transverse crash acceleration signal designated ACU_Y.

The crash acceleration signals from the crash sensors 46, 48 can take any of several forms. Each of the crash acceleration signals can have amplitude, frequency, pulse duration, etc., or any other electrical characteristics that vary as a function of the sensed crash acceleration. In accordance with an example embodiment, the crash acceleration signals have frequency and amplitude characteristics indicative of the sensed crash acceleration. The outputs of the sensors 46, 48 are connected to the ACU 40 for processing and evaluation.

Also, the central event sensors 42 include a plurality of inertial sensors ("IS") 50 including a yaw rate sensor, a low-G acceleration sensor for measuring low level acceleration levels in the X-direction, and a low-G acceleration sensor for measuring low level acceleration levels in the Y-direction. The outputs of the IS sensors 50 are also connected to the ACU 40 for processing and evaluation that could be used in the control of the restraining devices.

In addition to the central event sensors 42, the event sensors 38 further include a plurality of multi-axis sensors ("MAS") located in the crush-zone area 52 of the vehicle 22 and remote MAS sensors located in side locations 54, 56 of the vehicle 22 such as in the vehicle B-pillars. The forwardly located MAS sensors include a driver's side and passenger side crush-zone satellite acceleration sensors ("CZS") 60, 62, respectively. The driver's side CZS 60 includes acceleration sensors having an XY-axis of sensitivity substantially oriented to sense crash acceleration parallel with the vehicle's X-axis (sensor 64) and the Y-axis (sensor 66), respectively. The signals output from the driver's side, crush-zone sensors 64, 66 are designated as LX-CZS and LY-CSZ, respectively. The passenger's side CZS 62 includes acceleration sensor having an XY-axis of sensitivity substantially oriented to sense crash acceleration parallel with the vehicle's X-axis (sensor 68) and Y-axis (sensor 70), respectively. The signals output from the passenger's side, crush-zone sensors 68, 70 are designated as RX-CZS and RY-CZS, respectively. These output signals of the CZS 64, 66, 68, and 70 are connected to the ACU 40 for processing and evaluation.

In accordance with an example embodiment of the present invention, the sensors 64, 66, 68, 70 are capable of measuring accelerations of +/−250 g's along their associated axis of sensitivity. The signals from the crush-zone sensors 64, 64, 68, 70 can have amplitude, frequency, pulse duration, etc., or any other electrical characteristics that vary as a function of the sensed crash acceleration. In accordance with an example embodiment, the CZS signals have frequency and amplitude characteristics indicative of the crash acceleration experienced at those sensor locations of the vehicle 22. The crush-zone sensors can be mounted at or near the radiator location of the vehicle and serve to better discriminate certain types of crash event conditions by supplementing the indications provided by the centrally located crash event sensors 46, 48, 50.

The crash event sensors 38 further include a remote located driver's side multi-axis satellite sensor ("MAS") 72 mounted on the driver's side of the vehicle such as at the driver's side B-pillar. The MAS sensor 72 includes two side-impact-satellite ("SIS") crash acceleration sensors for sensing crash acceleration in the X-direction (sensor 74) and the Y-direction (sensor 78). The SIS sensor 74 provides a crash acceleration signal designated as LBX-SIS and the SIS sensor 78 provides a crash acceleration signal designated as LBY-SIS, both having frequency and amplitude characteristics indicative of crash acceleration in the X-axis direction and the Y-axis, respectively. These output signals are also connected to the ACU 40 for processing and evaluation.

A remote located passenger's multi-axis satellite sensor ("MAS") 80 is mounted on the passenger's side of the vehicle such as at the passenger's side B-pillar and includes an X-direction side-impact-satellite ("SIS") sensor 82 and a Y-direction side-impact-satellite ("SIS") sensor 83. The SIS sensor 82 provides a crash acceleration signal designated as RBX-SIS having frequency and amplitude characteristics indicative of crash acceleration in the X-direction. The SIS sensor 83 provides a crash acceleration signal designated as RBY-SIS having frequency and amplitude characteristics indicative of crash acceleration in the Y-direction. These output signals are also connected to the ACU 40 for processing and evaluation.

Figure 3:
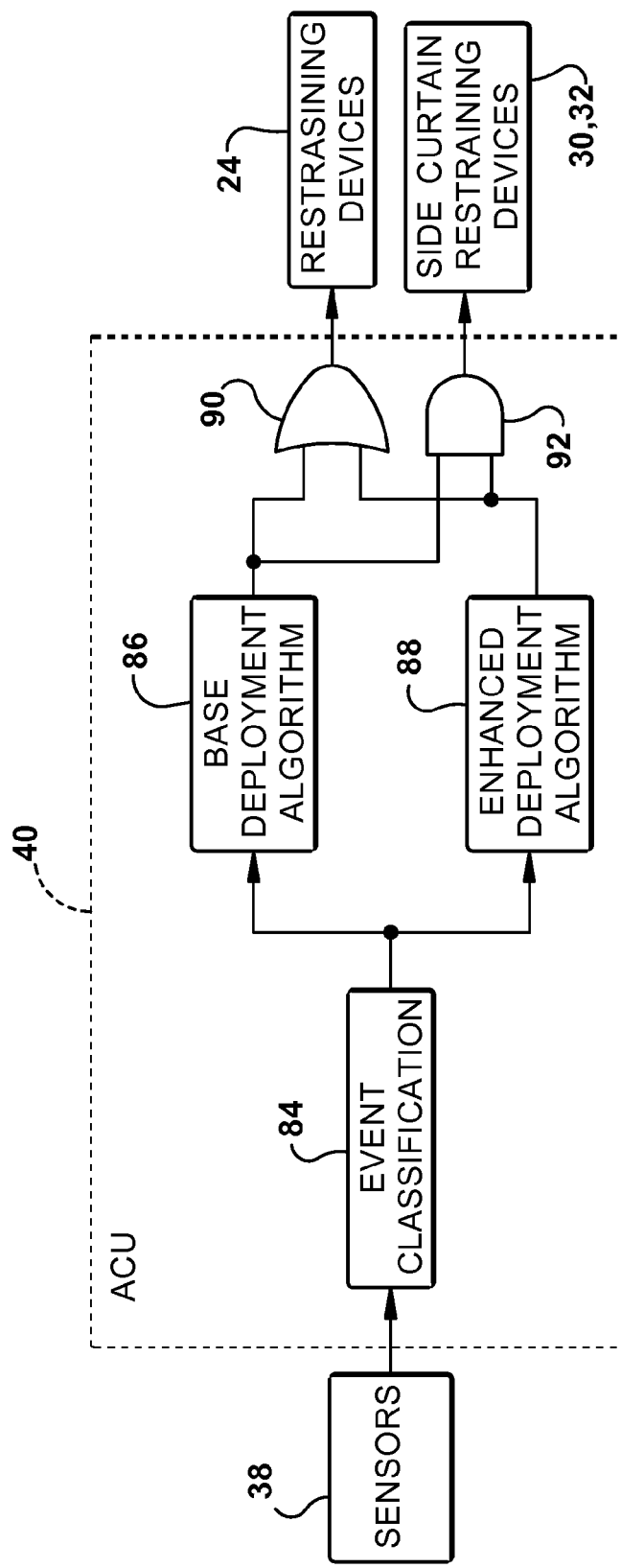
FIG. 3 is a schematic block diagram depicting the overall control architecture for processing sensor signals in accordance with an example embodiment of the present invention.

Referring to FIG. 3, the overall signal processing architecture of the present invention will be appreciated. As mentioned, the event sensors 38 are connected to the ACU 40. The ACU 40 monitors the output signals from each of the event sensors 38 and performs a base deployment algorithm and an enhanced control algorithm to discriminate whether a vehicle deployment or non-deployment crash event is occurring. Each crash algorithms measures and/or determines values of the crash event from the crash acceleration signals. These values are used in deployment and actuation decisions.

In particular, the ACU 40, in accordance with the present invention, includes an event classification function 84 that classifies a vehicle event sensed by the sensors into one of a plurality of possible events. The ACU 40, based on the event classification 84, performs a base deployment algorithm 86 and an enhanced deployment algorithm 88. The results of the two deployment algorithms 86, 88 are logically OR'ed together by an OR'ing function 90, the output of which is used for control of the restraining devices 24 in a manner described below. The results of the two deployment algorithms 86, 88 are also logically AND'ed together by an AND'ing function 92, the output of which is used for control of the side curtain restraining devices 30, 32 in a manner described below.

The base deployment algorithm, for the purpose of the present invention, can be the any known method and apparatus for controlling an actuatable restraining device in response to crash event sensor signals such as that shown and described in U.S. Pat. No. 6,776,435. This '435 patent similarly includes central acceleration sensors and crush zone acceleration sensors. The actuatable restraining devices are controlled in response to determined crash velocity values as a function of crash displacement values compared against plural threshold values, the values of the thresholds being, under particular crash events, switched to different threshold values. The switching of the threshold values, for example, is controlled in response to crash acceleration values as a function of crash displacement values. Misuse boxes are also used in the '435 patent control process. Sensor signal values must be outside of the misuse boxes before deployment can occur. As mentioned, the base deployment algorithm 86 can be as described in the '435 patent. Also, as mentioned, other known deployment control algorithms can be used as the base deployment algorithm 86. The present invention provides the enhanced deployment method and apparatus so provide a quicker deployment under certain vehicle crash event conditions.

In accordance with the present invention, the ACU 40 monitors the central crash event sensors 42, the SIS MAS crash event sensors 72, 80, and CZS MAS crash event sensors 60, 62 and performs an event classification analysis 84 to, not only provide classification of events that are used by the base deployment algorithm, but to classify particular crash events specifically used by the enhanced discrimination algorithm 88, i.e., particular vehicle crash event classifications, including (1) a high speed frontal rigid barrier impact event, (2) an offset deformable barrier impact event (e.g., a crash event involving a 40% overlap with a deformable barrier), (3) an oblique/angular frontal rigid barrier impact event, and (4) a small/narrow overlap impact event (e.g., a crash event involving a 25% overlap typically with a rigid barrier). When such an event is determined to be occurring, the time to actuate the restraining devices 24 is adjusted to provide a quicker actuation of the restraining devices 24 by OR'ing 90 the results of the base deployment algorithm 86 with the enhanced deployment algorithm 88 and a quicker actuation of the restraining devices 30, 32 by AND'ing 92 the results of the base deployment algorithm 86 with the enhanced deployment algorithm 88.

As mentioned, the small/narrow overlap impact event is a new crash test that is being conducted on vehicles by the Insurance Institute of Highway Safety ("IIHS"). Also, the U.S. New Car Assessment Program ("US NCAP") has also instituted a new test for a 5% 56-kph frontal rigid barrier ("FRB") crash event. The present invention provides a better assessment and discrimination of these particular events and deployment result by providing:

(1) A very fast decision/sensing time (time to fire "TTF") for frontal airbags and pretensioners (in the range of 5 ms to 10 ms) for 56-kph FRB & Small/Narrow Overlap Impact events;

(2) A robust and well controlled must-deploy decision of Side Curtain

Airbags for Small Overlap impact events, Oblique/Angular, and offset deformable barrier ("ODB") events and a no-deploy decision of the Curtain Airbag for a 56-kph FRB event;

(3) An improved deployment decision timing for ODB impact events; and (4) Improve control of the Seat-belt Load Limiters for all high severity impact events.

Figure 4:
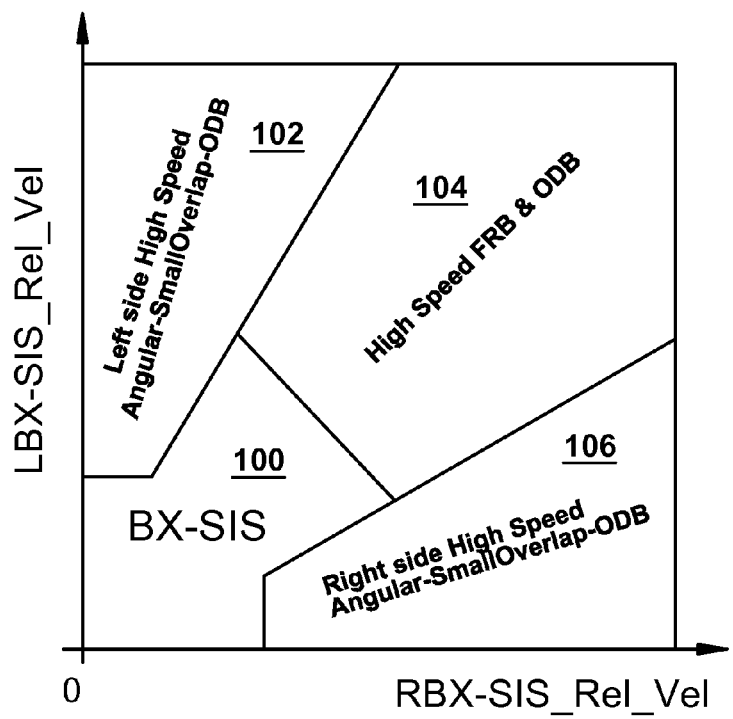
FIGS. 4-9 show graphical representations of vehicle event values used in the event classification process in accordance with an example embodiment of the present invention.
Figure 5:
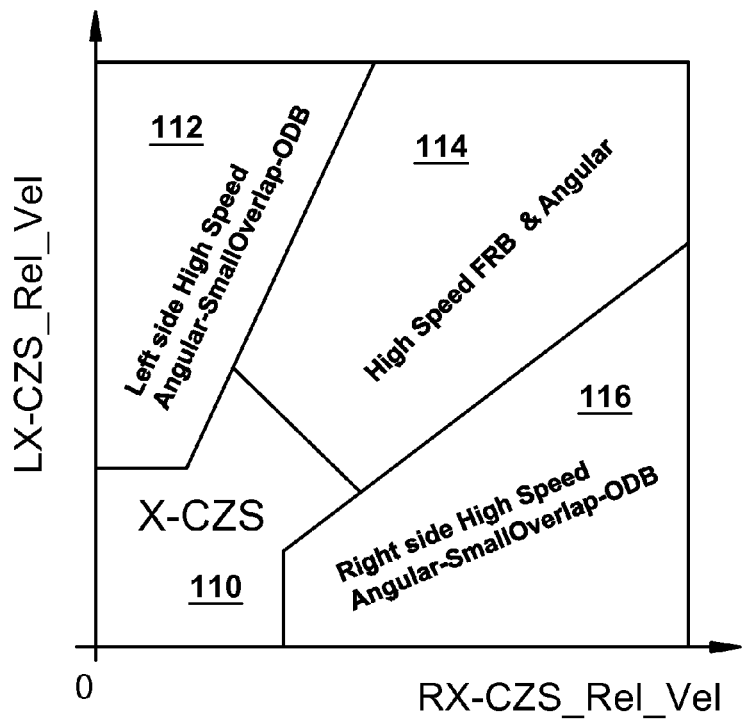

In accordance with one example embodiment of the present invention, the event classification function 84 is performed by monitoring various combinations of the output signals of the sensors 38. Referring to FIGS. 4-9 one classification scheme, according to an example embodiment of the present invention, is shown. In FIGS. 4 and 5, determined crash velocity values are compared to determine event classification. These velocity values are based on the sensed acceleration signals. In accordance with one example embodiment, certain of the crash acceleration signals are evaluated in accordance with a spring mass model technique disclosed in U.S. Pat. No. 5,935,182 to Foo et al. Crash velocity values and crash displacement values are determined from the spring mass model adjusted acceleration signals.

In particular, in FIG. 4, the event classification function monitors LBX-SIS_Rel_Vel values as a function of RBX-SIS_Rel_Vel values. Again, these velocity values are determined from the acceleration sensor signal values such as by integration. If the determine velocity values fall into area 100, the base deployment algorithm 86 will be used to control deployment of the restraining devices 24, 30, and 32. If the determined values fall into areas 102, 104, or 106, the enhanced deployment algorithm 88 will be OR'ed with the base deployment algorithm to control deployment of the restraining devices 24 and AND'ed with the base deployment algorithm to control deployment of the side curtains 30, 32, both resulting in a quicker TTF (time-to-fire or time-to-deploy) as described in more detail below. The values falling within area 102 indicate (i.e., classified as) the vehicle event is a left side high speed angular crash event, a small overlap crash event, or a crash event into an offset deformable barrier ("ODB") by the left side of the vehicle. The values falling within area 104 indicate (i.e., classified as) the event is a high speed crash into a front rigid barrier ("FRB") or into an ODB. The values falling within the area 106 indicate (i.e., classified as) the event is a right side high speed angular crash event, a small overlap crash event, or a crash event into an ODB by the right side of the vehicle.

In FIG. 5, the event classification function monitors LX-CZS_Rel_Vel values as a function of RX-CZS_Rel_Vel values. If the determine values fall into area 110 the base deployment algorithm 86 will be used to control deployment of the restraining devices 24, 30, and 32. If the determined values fall into areas 112, 114, or 116, the enhanced deployment algorithm 88 will be OR'ed with the base deployment algorithm to control deployment of the restraining devices 24 and AND'ed with the base deployment algorithm to control deployment of the side curtains 30, 32, both resulting in a quicker TTF. The values falling within area 112 indicate (i.e., classified as) the vehicle event is a left side high speed angular crash event, a small overlap crash event, or a crash event into an ODB by the left side of the vehicle. The values falling within area 114 indicate (i.e., classified as) the event is a high speed crash into a FRB or an angular crash event. The values falling within the area 116 indicate (i.e., classified as) the event is a right side high speed angular crash event, a small overlap crash event, or a crash event into an ODB by the right side of the vehicle.

Figure 6:
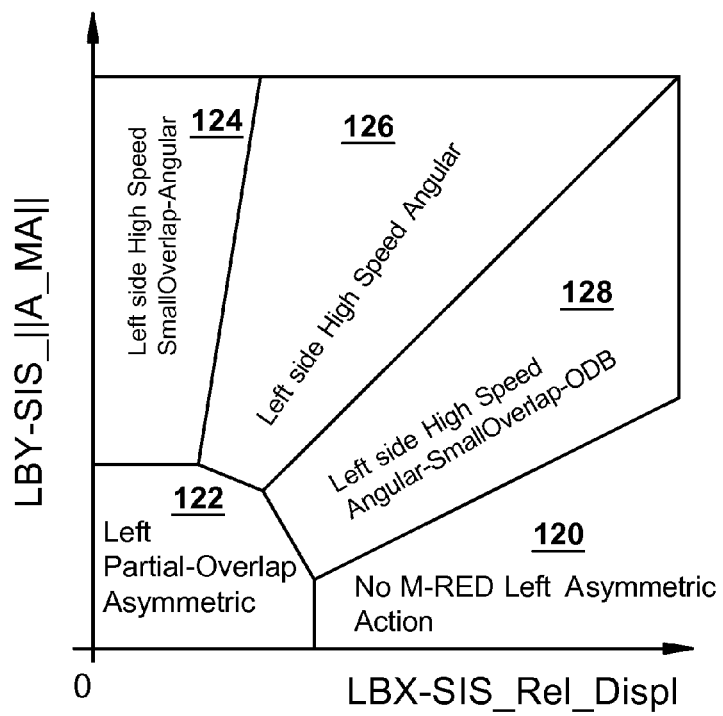
Figure 7:
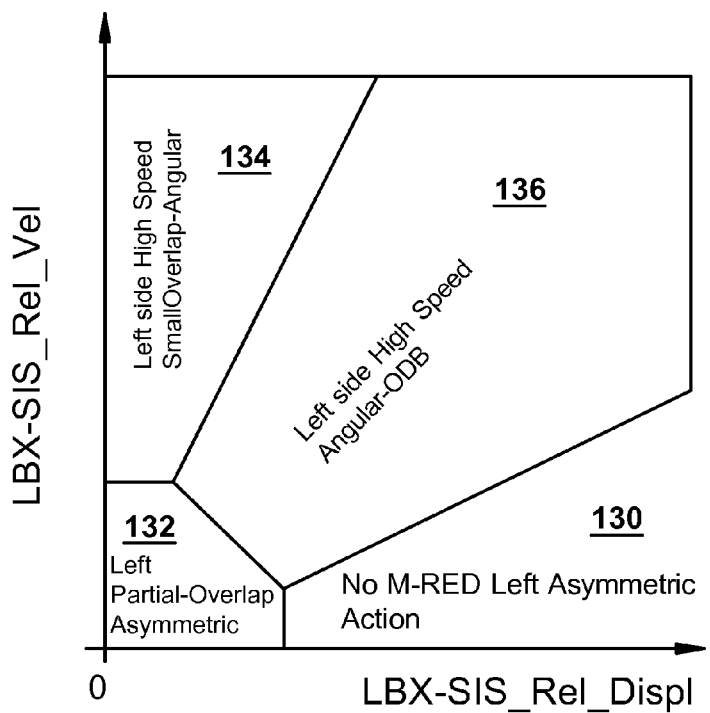

FIGS. 6 and 7 depict two other classification schemes used by the event classification function 84 for left side impact events. In particular, in FIG. 8, the event classification function monitors LBY-SIS_||A_MA|| values as a function of LBX-SIS_Rel_Displ values. The LBY-SIS_||A_MA|| values are the moving average of the absolute value of the acceleration values from the LBY-SIS sensor 78. The LBX-SIS_Rel_Displ values are displacement values (double integral of acceleration) determined from the LBX-SIS sensor 74. If the determine values fall within area 120 means (i.e., classified as) there is no M-RED left asymmetric crash event occurring and the base deployment algorithm 86 will be used to control deployment of the restraining devices 24, 30, and 32. If the determined values fall within areas 122, 124, 126, or 128 the enhanced deployment algorithm 88 will be OR'ed with the base deployment algorithm to control deployment of the restraining devices 24 and AND'ed with the base deployment algorithm to control deployment of the side curtains 30, 32, both resulting in a quicker TTF. The values falling within area 122 indicate (i.e., classified as) the vehicle event is a left partial overlap asymmetric crash event. The values falling within area 124 indicated (i.e., classified as) the vehicle event is a left side high speed small overlap crash event or an angular crash event by the left side of the vehicle. The values falling within area 126 indicate (i.e., classified as) the event is a left side high speed angular crash event. The values falling within the area 128 indicate (i.e., classified as) the event is a left side high speed angular crash event, a small overlap crash event, or a crash event into an ODB by the left side of the vehicle.

FIG. 7, the event classification function monitors LBX-SIS_Rel_Vel values as a function of LBX-SIS_Rel_Displ values. The determine values falling within area 130 means that there is no M-RED left asymmetric crash event occurring and the base deployment algorithm 86 will be used to control deployment of the restraining devices 24, 30, and 32. If the determined values fall into areas 132, 134, or 136, the enhanced deployment algorithm 88 will be OR'ed with the base deployment algorithm to control deployment of the restraining devices 24 and AND'ed with the base deployment algorithm to control deployment of the side curtains 30, 32, both resulting in a quicker TTF. The values falling within area 132 indicate (i.e., classified as) the vehicle event is a left partial overlap asymmetric crash event. The values falling within area 134 indicated (i.e., classified as) the vehicle event is a left side high speed small overlap crash event or an angular crash event by the left side of the vehicle. The values falling within area 136 indicate (i.e., classified as) the event is a left side high speed angular crash event or a crash event into an ODB.

Figure 8:
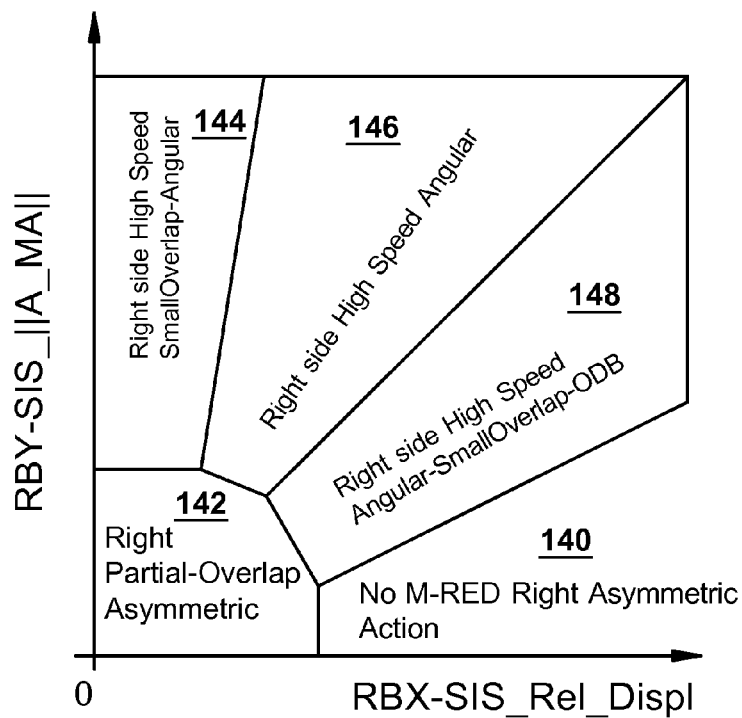
Figure 9:
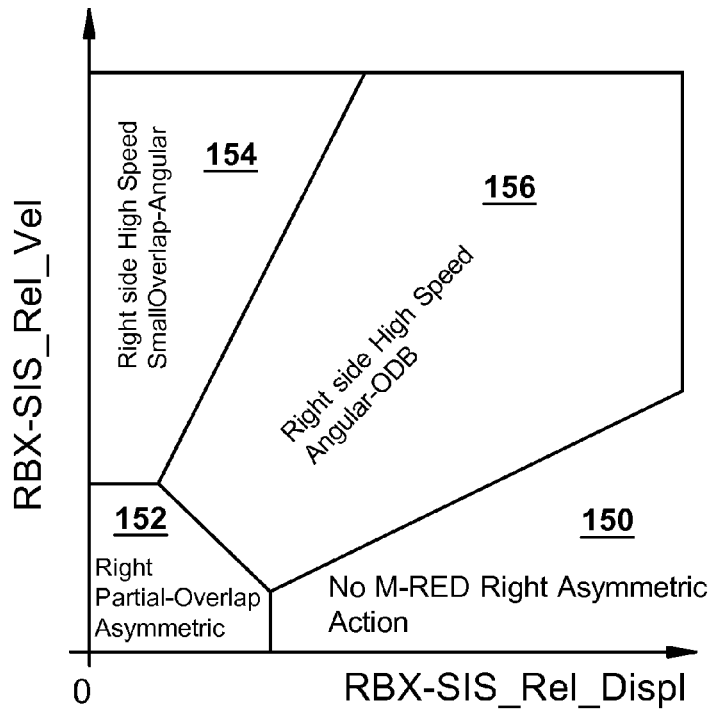

FIGS. 8 and 9 depict two other classification schemes used by the event classification function 84 for right side impact events. In particular, in FIG. 8, the event classification function monitors RBY-SIS_||A_MA|| values as a function of RBX-SIS_Rel_Displ values. The RBY-SIS_||A_MA|| values are the moving average of the absolute value of the acceleration values from the RBY-SIS sensor 83. The RBX-SIS_Rel_Displ values are displacement values (double integral of acceleration) determined from the RBX-SIS sensor 82. If the determine values fall within area 140 means that there is no M-RED right asymmetric crash event occurring and the base deployment algorithm 86 will be used to control deployment of the restraining devices 24. If the determined values fall within areas 142, 144, 146, or 148 the enhanced deployment algorithm 88 will be OR'ed with the base deployment algorithm to control deployment of the restraining devices 24 and AND'ed with the base deployment algorithm to control deployment of the side curtains 30, 32, both resulting in a quicker TTF. The values falling within area 142 indicate (i.e., classified as) the vehicle event is a right partial overlap asymmetric crash event. The values falling within area 144 indicated (classified as) the vehicle event is a right side high speed small overlap crash event or an angular crash event by the right side of the vehicle. The values falling within area 146 indicate (i.e., classified as) the event is a right side high speed angular crash event. The values falling within the area 148 indicate (i.e., classified as) the event is a right side high speed angular crash event, a small overlap crash event, or a crash event into a ODB by the right side of the vehicle.

FIG. 9, the event classification function monitors RBX-SIS_Rel_Vel values as a function of RBX-SIS_Rel_Displ values. The determine values falling within area 150 means that there is no M-RED right asymmetric crash event occurring and the base deployment algorithm 86 will be used to control deployment of the restraining devices 24. If the determined values fall into areas 152, 154, or 156, the enhanced deployment algorithm 88 will be OR'ed with the base deployment algorithm to control deployment of the restraining devices 24 and AND'ed with the base deployment algorithm to control deployment of the side curtains 30, 32, both resulting in a quicker TTF. The values falling within area 152 indicate (i.e., classified as) the vehicle event is a right partial overlap asymmetric crash event. The values falling within area 154 indicate (i.e., classified as) the vehicle event is a right side high speed small overlap crash event or an angular crash event by the right side of the vehicle. The values falling within area 156 indicate (i.e., classified as) the event is a right side high speed angular crash event or a crash event into an ODB.

Figure 10:
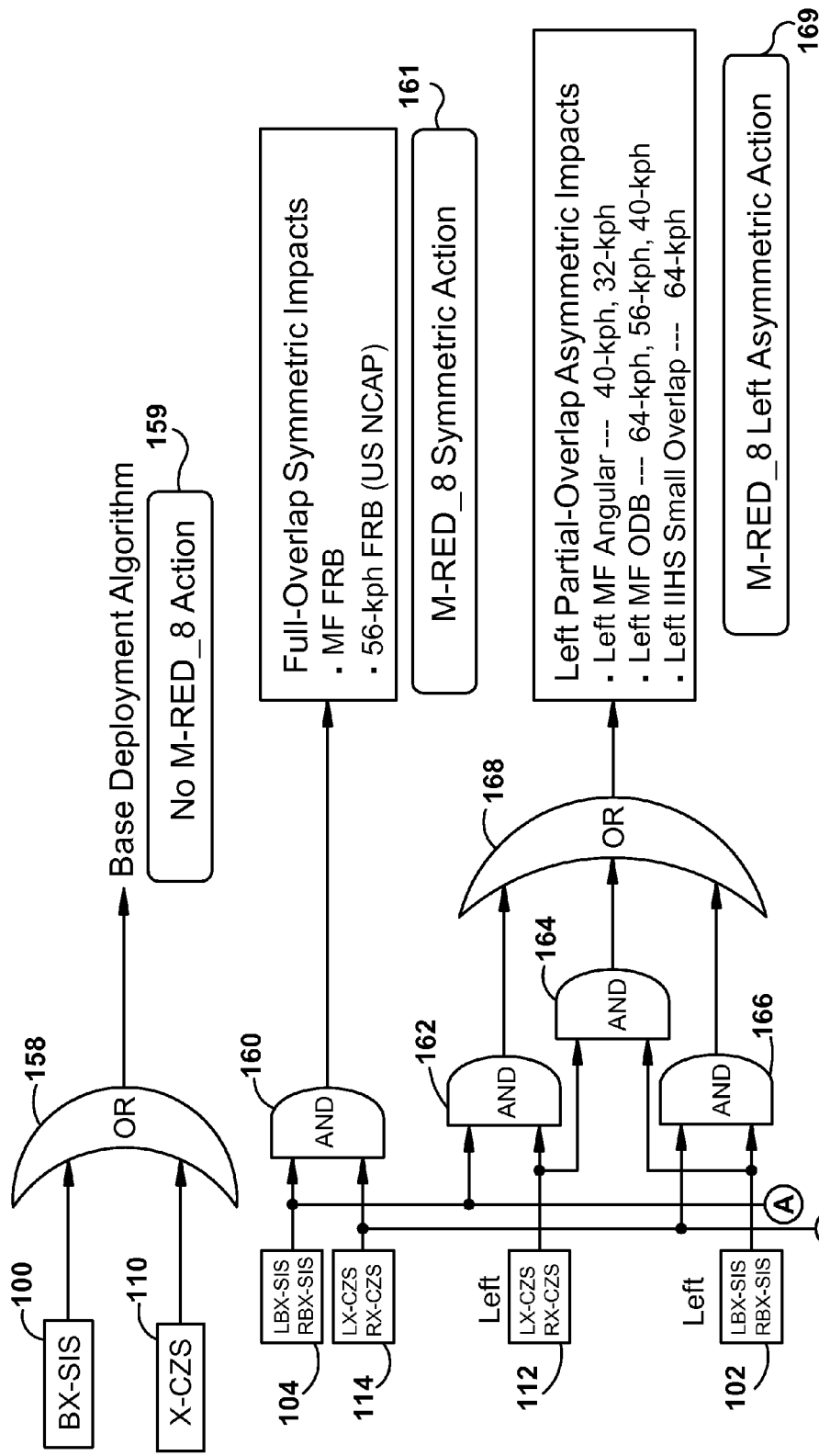
FIGS. 10-13 are logic diagrams to establish logic control switch condition values in accordance with an example embodiment of the present invention.
Figure 11:
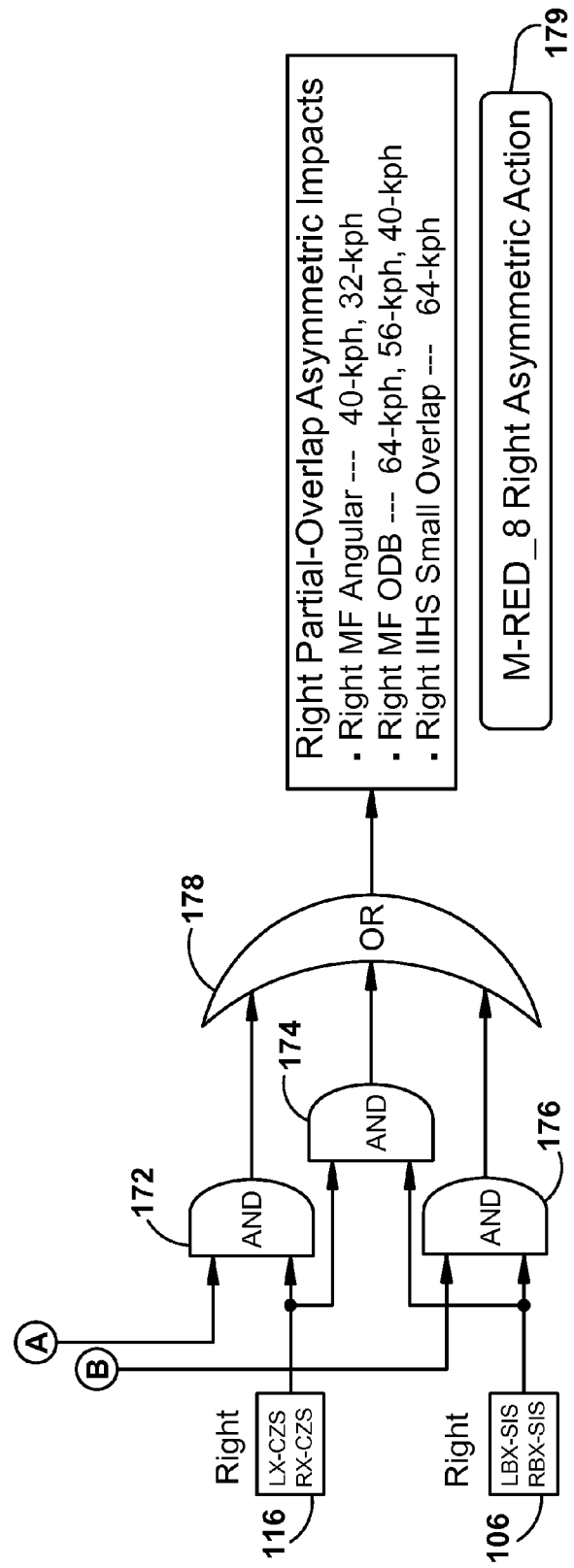

Referring to FIGS. 10-13 along with the classification graphs of FIGS. 4-9 the processing of the event classifications in accordance with the present invention will be better understood for the establishment of logic control switch values. The logic control process shown in FIGS. 10 and 11 are used to determine if there is a full-overlap symmetric crash event occurring, if a left partial overlap asymmetric crash event is determined to be occurring, or if a right partial overlap asymmetric crash event is determined to be occurring. If none of those events are occurring, then the base deployment control algorithm 86 provides the sole deployment control of the restraining devices. If one of those events is determined to be occurring, the enhanced algorithm is OR'ed and AND'ed with the base control algorithm to control the deployment.

Referring to FIGS. 10 and 11, if the determined values from the graphs of FIGS. 4-9 have values that fall within areas 100, 110, the base control algorithm is used in the deployment decision as OR'ed by OR'ing function 158. Such a result is referred to as No M-RED_8 Action 159 meaning that no enhanced control is provided. If determined values are within areas 104 and 114, that occurrence is AND'ed in function 160 for a determination that a full overlap symmetric crash event is occurring. This occurrence is referred to as M-RED_8 Symmetric Action 161.

If a full overlap symmetric impact event is determined to be occurring, the enhanced deployment algorithm is OR'ed with basic deployment algorithm. If the values fall within areas 104 and 112, the AND function 162 will be HIGH. If the values fall in areas 102 and 112, the AND function 164 will be HIGH. If the values fall in areas 102 and 114, AND function 166 will be HIGH. If any of the AND functions 162, 164, 166 are HIGH, the OR function 168 determines that a left partial overlap asymmetric crash event is occurring. This occurrence is referred to as M-RED _8 Left Asymmetric Action 169.

If a left partial overlap asymmetric impact event is determined to be occurring, the enhanced deployment algorithm is OR'ed with basic deployment algorithm. If the values fall within areas 104 and 116 the AND function 172 will be HIGH. If the values fall in areas 106 and 116, the AND function 174 will be HIGH. If the values fall in areas 106 and 114, AND function 176 will be HIGH. If any of the AND functions 172, 174, 176 are HIGH, the OR function 178 determines that a right partial overlap asymmetric crash event is occurring. This occurrence is referred to a M-RED _8 Right Asymmetric Action 179.

If a right partial overlap asymmetric impact event is determined to be occurring, the enhanced deployment algorithm is OR'ed and AND'ed with basic deployment algorithm.

Figure 12:
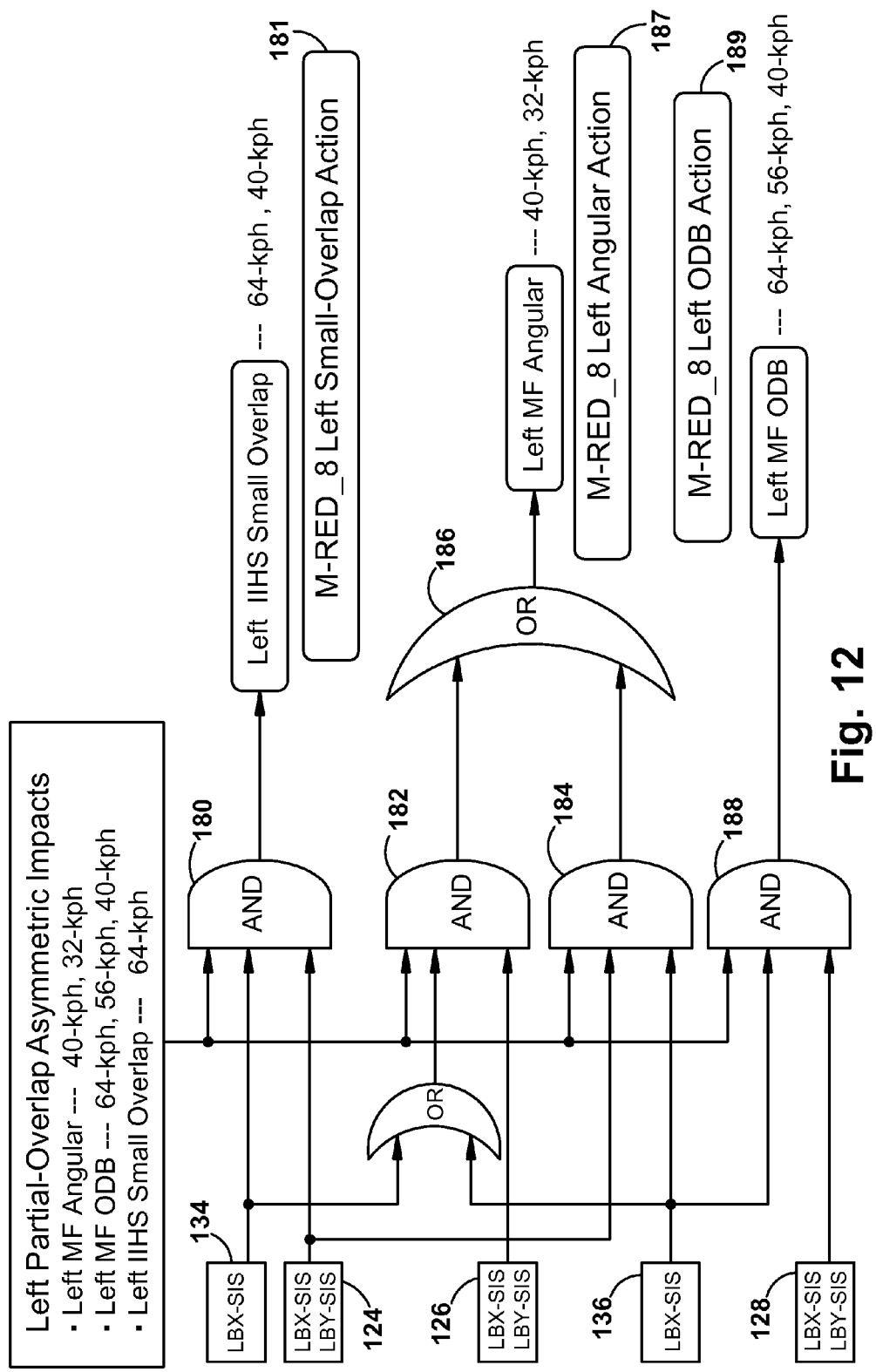
Figure 13:
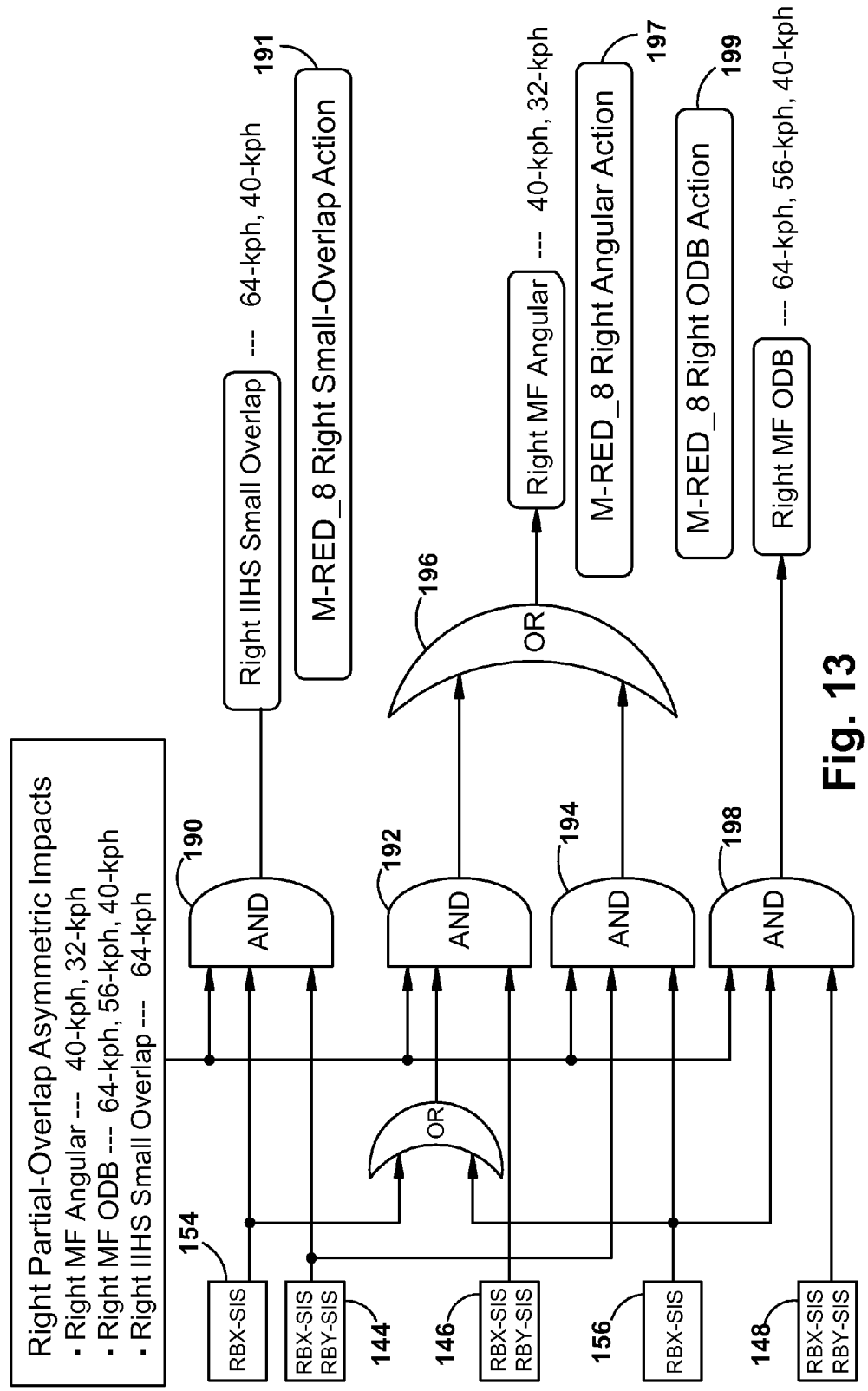

Referring to FIGS. 12 and 13, the control arrangement to classify addition crash events is shown using parts of the results form FIGS. 10 and 11. Referring to FIG. 12 and assuming the occurrence of a left partial overlap asymmetric impact event is determined to be occurring, i.e., the output from the OR'ing function 168 is HIGH in FIG. 10, the left partial overlap asymmetric impact determination is AND'ed with additional value determinations from graphs depicted in FIGS. 4-9. In particular, the left partial overlap asymmetric impact determination is AND'ed in AND function 180 with a determinations if values are determined to be in areas 124 AND 134. If the output of AND function 180 is HIGH, a left small overlap crash event is determined to be occurring. This occurrence is referred to as M-RED _8 Left Small-Overlap Action 181.

The left partial overlap asymmetric impact determination is AND'ed in AND function 182 with a determination of values fall within area 126 AND values in area 134 OR area 136. The left partial overlap asymmetric impact determination is AND'ed in AND function 184 with determinations if values are in areas 124 and 136. The outputs of AND functions 182 and 184 are OR'ed in function 186. If the output of OR function 186 is HIGH, that indicates a left angular crash event is occurring. This is referred to as M-RED_8 Left Angular Action 187.

The left partial overlap asymmetric impact determination is further AND'ed with a determination if values are located in areas 128 AND 136 in AND function 188. If the output of AND function 188 is HIGH, a left ODB event is determined to be occurring. This is referred to as M-RED_8 Left ODB Action 189.

Referring to FIG. 13, the right partial overlap asymmetric impact determination from FIG. 11 is AND'ed with additional value determinations from graphs depicted in FIGS. 4-9. In particular, the right partial overlap asymmetric impact determination is AND'ed in AND function 190 with a determinations if values are determined to be in areas 144 AND 154. If the output of AND function 190 is HIGH, a right small overlap crash event is determined to be occurring. This is referred to as M-RED_8 Right Small-Overlap Action 191.

The right partial overlap asymmetric impact determination is AND'ed in AND function 192 with a determination of values fall within area 146 AND values in area 144 OR area 156. The right partial overlap asymmetric impact determination is AND'ed in AND function 194 with determinations if values are in areas 144 and 156. The outputs of AND functions 192 and 194 are OR'ed in function 196. If the output of OR function 196 is HIGH, that indicates a right angular crash event is determined to be occurring. This is referred to as M-RED_8 Right Angular Action 197.

The right partial overlap asymmetric impact determination is further AND'ed with a determination if values are located in areas 148 AND 156 in AND function 198. If the output of AND function 198 is HIGH, a right ODB event is determined to be occurring. This is referred to as M-RED_8 Right ODB Action 199.

Referring to FIG. 14, a logic control table for establishing logic control switch values is depicted. The values in the left had column of FIG. 14 are derived from the results from classification determinations shown in FIGS. 10-13. Additionally, in the left hand column, the No M-RED_8 Left Asymmetric Action values are derived from the values being in areas 120 or 130 of FIGS. 6 and 7, respectively, and No M-RED_8 Right Asymmetric Action values are derived from the values being in areas 140 or 140 of FIGS. 8 and 9, respectively.

Figure 15:
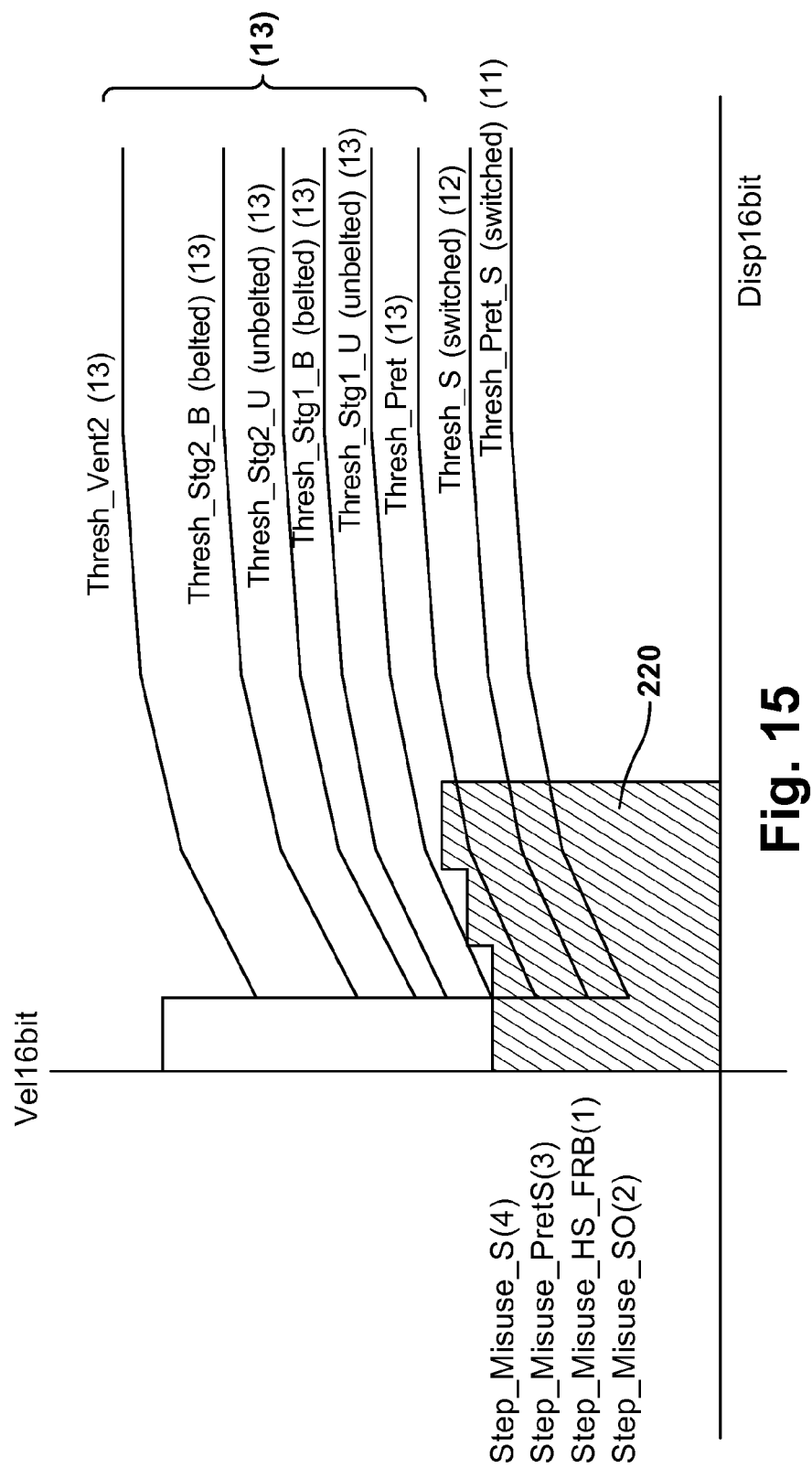
FIGS. 15 and 16 are graphical representations of event values used to establish further logic control switch condition values shown in FIG. 14.
Figure 16:
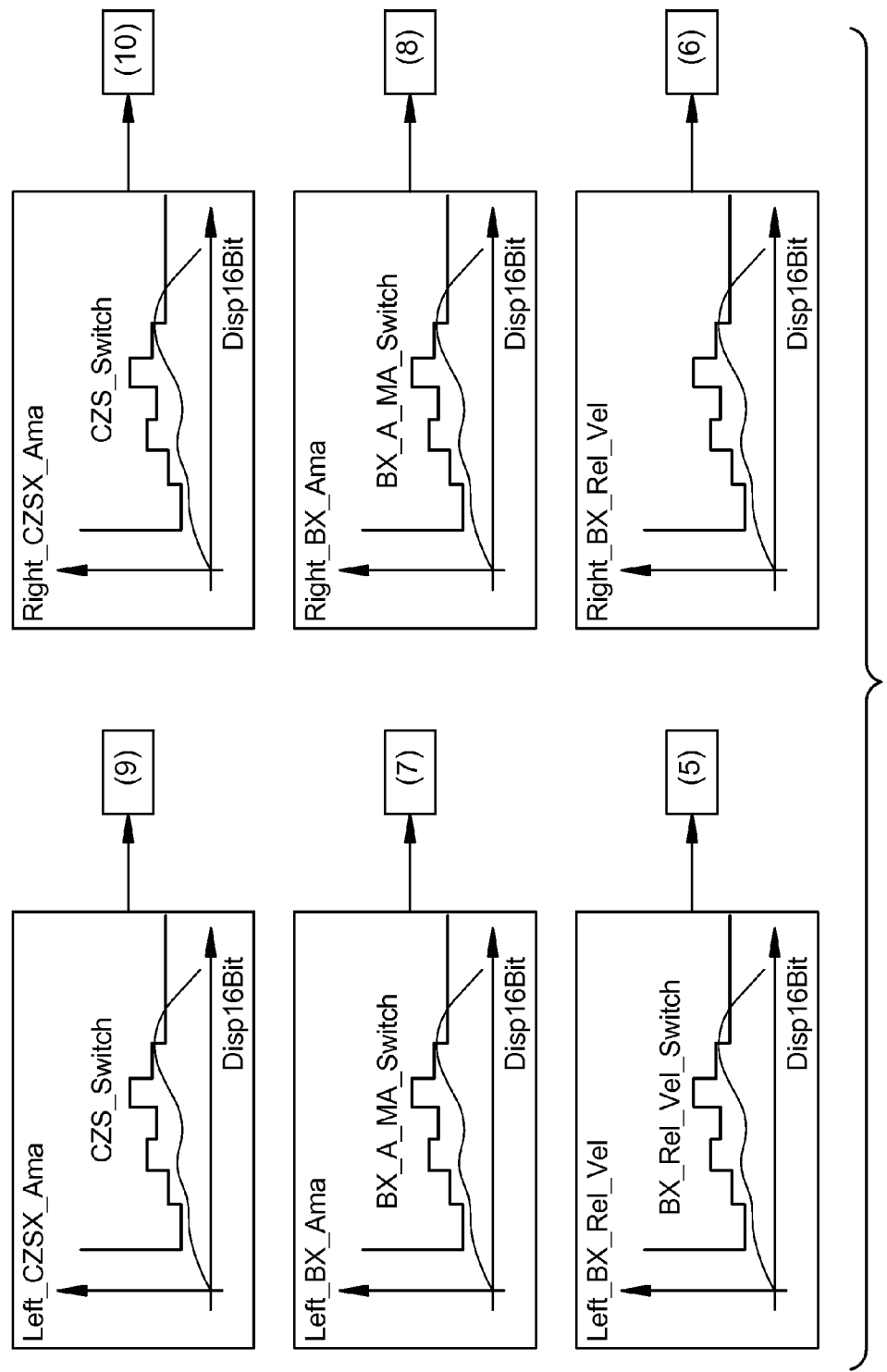

The top row across the table in FIG. 14 defines thirteen columns derived from values shown in FIGS. 15 and 16. Referring to FIG. 15, the base deployment algorithm compares crash velocity values as a function of crash displacement values against a plurality of threshold values. A plurality of misuse boxes is used. A misuse box defines values of velocity verses displacement values that must be exceeded before actuation of the restraining devices can occur. In accordance with this example embodiment, four misuse boxes are provided with one example misuse box shape 220 being shown. Each misuse box will have its own associated shape and values as determined through, for example, test evaluations of a particular vehicle platform. The four misuse boxes in accordance with the present invention are designated Step_Misuse_HS_FRB (high speed front barrier misuse box) used in column (1), Step_Misuse_SO (small overlap misuse box) used in column (2), Step_Misuse_PretS (pretensioner misuse box) used in column (3), Step_Misuse_S (airbag misuse box) used in column (4). Again, each of these misuse boxes will have values and shapes that are vehicle platform dependent. If the crash velocity value versus crash displacement values is outside of the associated misuse box, the value of the column is HIGH or TRUE.

Columns (11)-(13) are derived from the threshold value comparisons from FIG. 15. If the particular threshold value is exceed by the crash velocity value versus the crash displacement value, the column value is HIGH or TRUE.

Columns (5)-(10) in FIG. 14 are derived from the graphs shown in FIG. 16. Each of the columns (5)-(10) are HIGH or TRUE if their acceleration value or velocity value as a function of displacement exceeds their associated switch threshold value. For example, the column value for column (5) will be HIGH or TRUE if the Left_BX_rel_Vel value as a function of the displacement value exceeds its BX_Rel_Vel Switch threshold value.

The top row of FIG. 14 defines the following thirteen columns as follows:

(1) HS_FRB Misuse Box is HIGH when the misuse box values are exceeded as during a high speed front rigid barrier event;

(2) Small-overlap misuse box is HIGH when the misuse box values are exceeded during a small overlap impact event;

(3) PT switch misuse box is HIGH when the pre-tensioner misuse box values are exceeded;

(4) Airbag switch misuse box is HIGH when the switch misuse values are exceeded during an impact event;

(5) LBX_Rel_Vel value from the ACU_X sensor is HIGH when the switched threshold value is exceeded;

(6) RBX_Rel_Vel value from the ACU_X sensor is HIGH when the switched threshold value is exceeded;

(7) LBX_AMA value from the ACU_X sensor is HIGH when the switched threshold value is exceeded;

(8) RBX_Rel_Vel value from the ACU_X sensor is HIGH when the switched threshold value is exceeded;

(9) LCZX value from the ACU_X sensor is HIGH when the switched threshold value is exceeded;

(10) RCZX value from the ACU_X sensor is HIGH when the switched threshold value is exceeded;

(11) The PT switch V-Sensor value is HIGH when the threshold value is exceeded;

(12) The airbag switch V-Sensor value is HIGH when the threshold value is exceeded;

(13) The normal column is HIGH when the misuse box values and threshold values are exceeded.

The table shown in FIG. 14 depicts logic control switch values that are then used in the deployment control logic diagrams shown in FIGS. 15-26 for control of the actuatable restraining devices. Column and row values that have an "X" mean that those conditions do not affect of the deployment control algorithms. The logic control switch value of N-3, for example, shown in FIG. 14 will be HIGH or TRUE if (i) both the No M-RED_8 Action 159 is HIGH or TRUE AND the PT Switch Misuse Box value from column (3) is HIGH or TRUE, (ii) both the No M-RED_8 Left Asymmetric Action value is HIGH or TRUE AND the PT Switch Misuse Box value from column (3) is HIGH or TRUE, OR (iii) both the No M-RED_8 Right Asymmetric Action value is HIGH or TRUE AND the PT Switch Misuse Box value from column (3) is HIGH or TRUE. So, in effect, three different crash event conditions can set the logic control switch value N-3 to a HIGH or TRUE value. By way of another example, the logic control switch value of L-2 will be HIGH or TRUE only when M-RED_8 Left Small- Overlap Action 181 is TRUE or HIGH AND the Small-Overlap Misuse Box in column (2) is HIGH or TRUE. By way of a third example, the logic control switch value N-7 will be HIGH or TRUE when (i) No M-RED_8 Action is HIGH or TRUE, (ii) No M-RED_8 Left Asymmetric Action is HIGH or TRUE, OR (iii) No M-RED_8 Right Asymmetric Action is HIGH or TRUE AND LBX_AMA-ACU_X Switch Threshold is HIGH or TRUE (i.e., the threshold is exceeded).

The actuation of the restraint devices are shown for different vehicle crash events is shown in FIGS. 17-26 based on the logic control switch values from the table shown in FIG. 14. The base deployment algorithm 86 using the system of the '435 patent controls two stage airbags. The enhanced deployment algorithm, in accordance with this example embodiment of the present invention as shown in FIGS. 17-26, is making an adjustment to the timing of the deployment of the seat belt pretensioners and the actuation of the first stage of the two stage airbag deployment. Those skilled in the art should appreciate that the present invention is also applicable to deployment of a single stage airbag.

Figure 17:
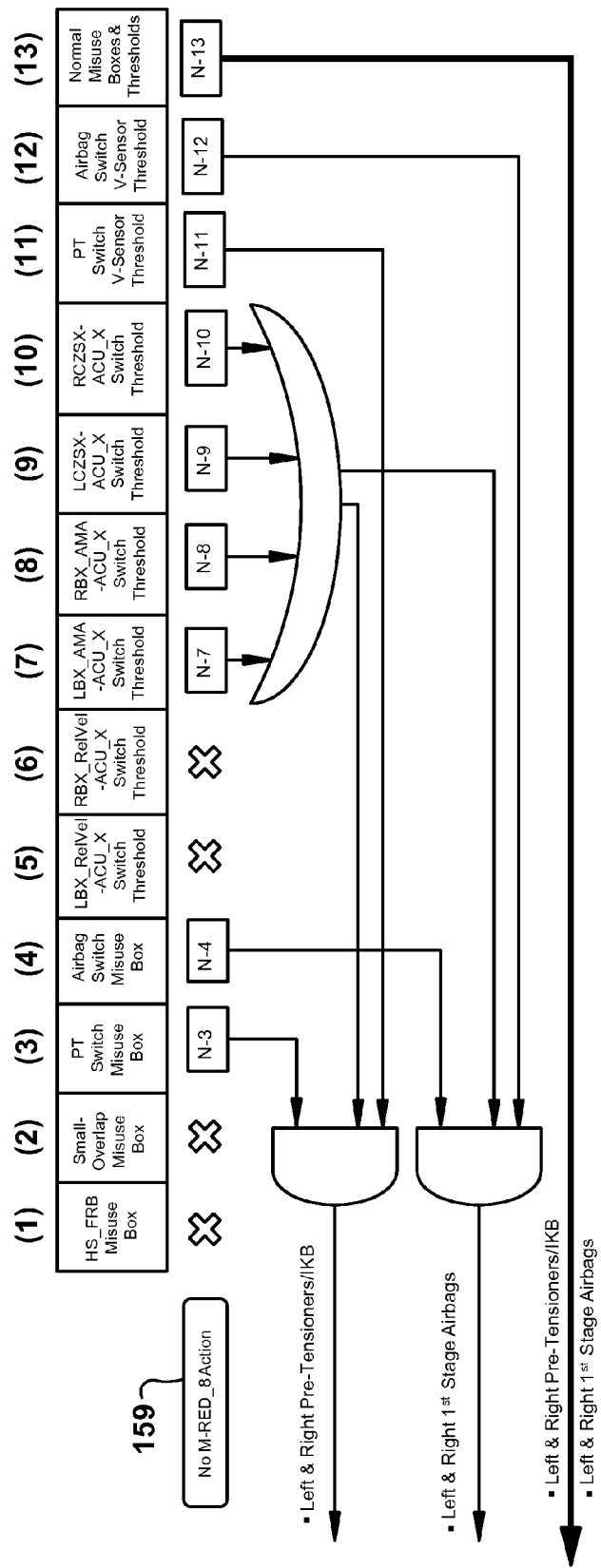
FIGS. 17-26 are logic control diagrams used to control the actuatable restraining devices, in accordance with the present invention, using the logic control switch values from the table of FIG. 14 for various different vehicle crash events.

By way of example, FIG. 17 shows a crash event classified as a No M-RED_8 Action event. The left/right pretensioners 34/36, and the first stage deployment of the left and right airbags 26/28 are controlled. The logic control value from column 13, i.e., logic control switch value N-13, represents the control by the base deployment algorithm 86. The additional control from logic control switch values N-3, N-4, N-7, N-8, N-9, N-10, N-11, and N-12 are from the enhanced algorithm 88. In accordance with this particular crash event, if the logic control switch values N-3 AND N-11 are HIGH AND (N-7 OR N-8 OR N-9 OR N-10) are HIGH, the left and right seat belt pretensioners 34, 36 are actuated by the enhanced deployment algorithm 88. If logic control switch values N-4 AND N-12 are HIGH and (N-7 OR N-8 OR N-9 OR N-10) are HIGH, the first stage of the airbags are actuated by the enhanced deployment algorithm 88. If none of those crash event classifications occur, the pretensions and airbag are actuated by the base deployment algorithm 86 when logic control switch N13 is HIGH.

Figure 18:
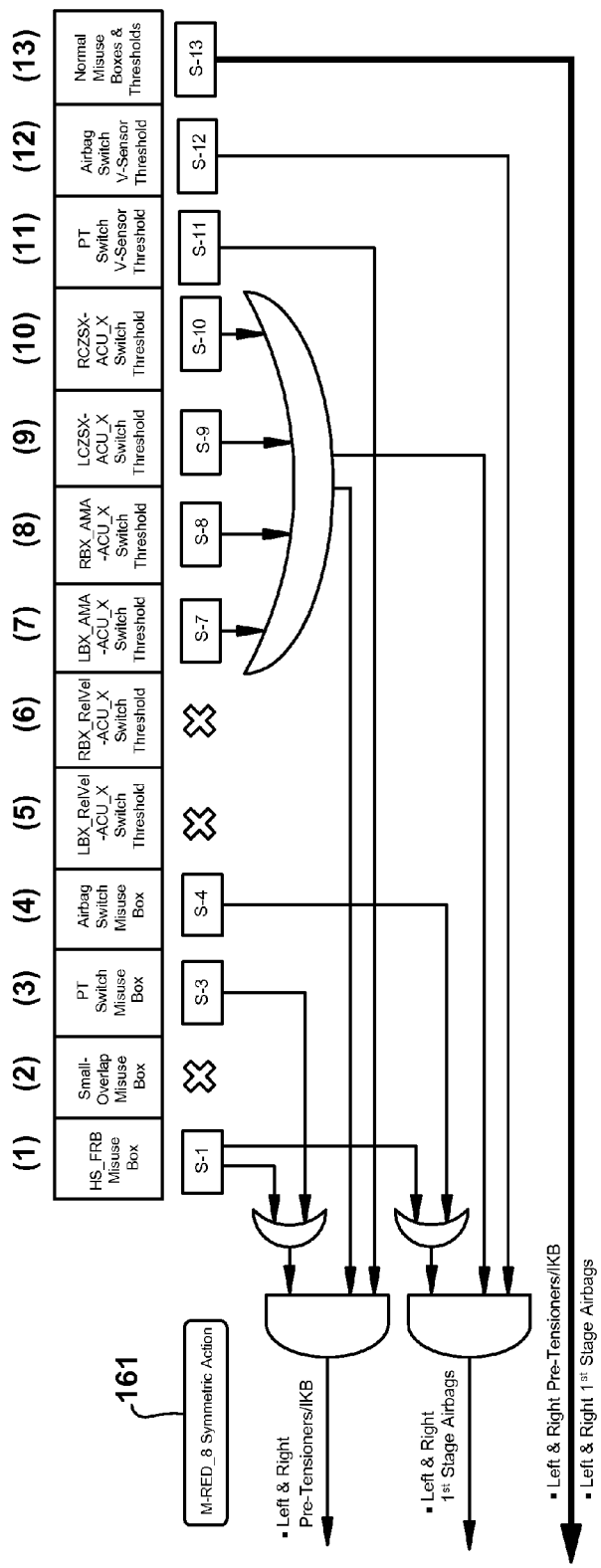

FIG. 18 shows a crash event classified as an M-RED_8 Symmetric Action event. The left/right pretensioners 34/36, and the first stage deployment of the left and right airbags 26/28 are controlled. The logic control value from column 13, i.e., S-13, represents the control by the base deployment algorithm 86. The additional control from logic control switch values S-1, S-3, S-4, S-7, S-8, S-9, S-10, S-11, and S-12 are from the enhanced algorithm 88 in accordance with the logic control diagram of FIG. 18. As is clear from FIG. 18, the left and right pretensioners will be actuated by the base deployment algorithm when S13 is HIGH. The enhanced deployment algorithm with actuate the left and right pretensioners 34, 36 when (S1 OR S3) are HIGH AND (S7 OR S8 OR S9 OR S10) are HIGH AND S11 is HIGH. The enhanced deployment algorithm will actuate the Left and Right first stage of the airbags 26, 28 when (S1 OR S4) are HIGH AND (S7 OR S8 OR S9 OR S10) are HIGH AND S12 is HIGH.

Similarly, FIGS. 19-26 show other example logic control arrangements that operate in a similar manner as described with regard to FIGS. 17 and 18 based on the logic control switch states shown in FIG. 14 and the specific logic control arrangement shown in each of the FIGS. 19-26.

Figure 19:
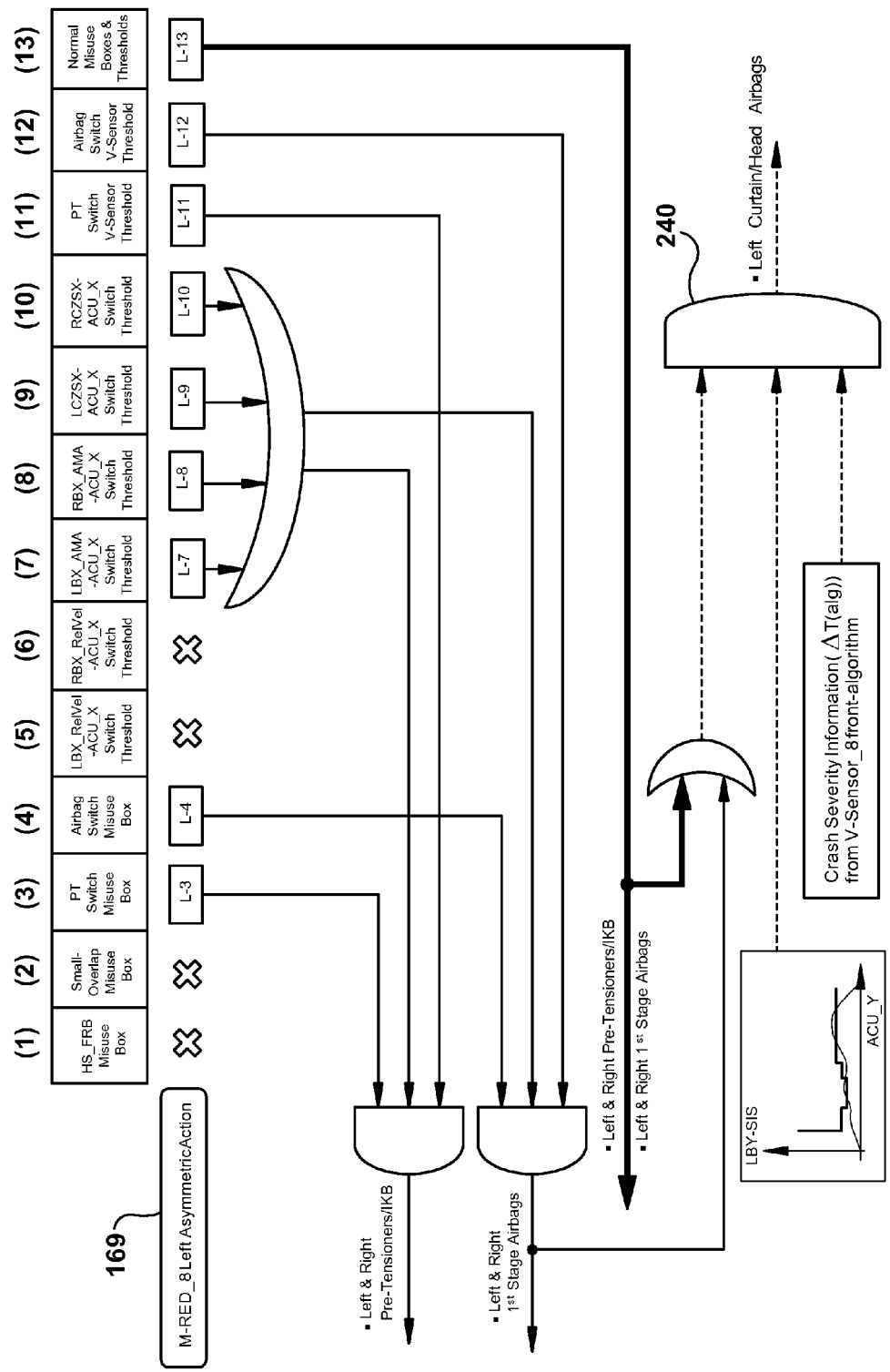

FIG. 19 shows a crash event classified as an M-RED_8 Left Symmetric Action event. The left/right pretensioners 34/36, and the first stage deployment of the left and right airbags 26/28 are controlled. The logic control value from column 13, i.e., L-13, represents the control by the base deployment algorithm 86. The additional control from logic control switch values L-3, L-4, L-7, L-8, L-9, L-10, L-11, and L-12 are from the enhanced algorithm 88 and control the pretensioners and first stage of the airbags in accordance with the logic control diagram of FIG. 19. In addition, the left curtain 30 (i.e., driver's side) is controlled based from a portion of the enhanced deployment algorithm being AND'ed with the base deployment algorithm by AND function 240. In particular, the enhanced deployment algorithm must decide that the first stage of the airbags is to be deployed by (L4 being HIGH AND (L7 OR L8 OR L9 OR L10) being HIGH AND L12 being HIGH) OR (L13 being HIGH) AND LBY-SIS as a function of ACU_Y value must exceed its associated threshold AND the crash severity value from the base deployment algorithm must be HIGH or TRUE. If so, the driver's side air curtain will then be deployed. In FIG. 19, the AND function 240 corresponds to the AND function 92 shown in FIG. 3.

Figure 20:
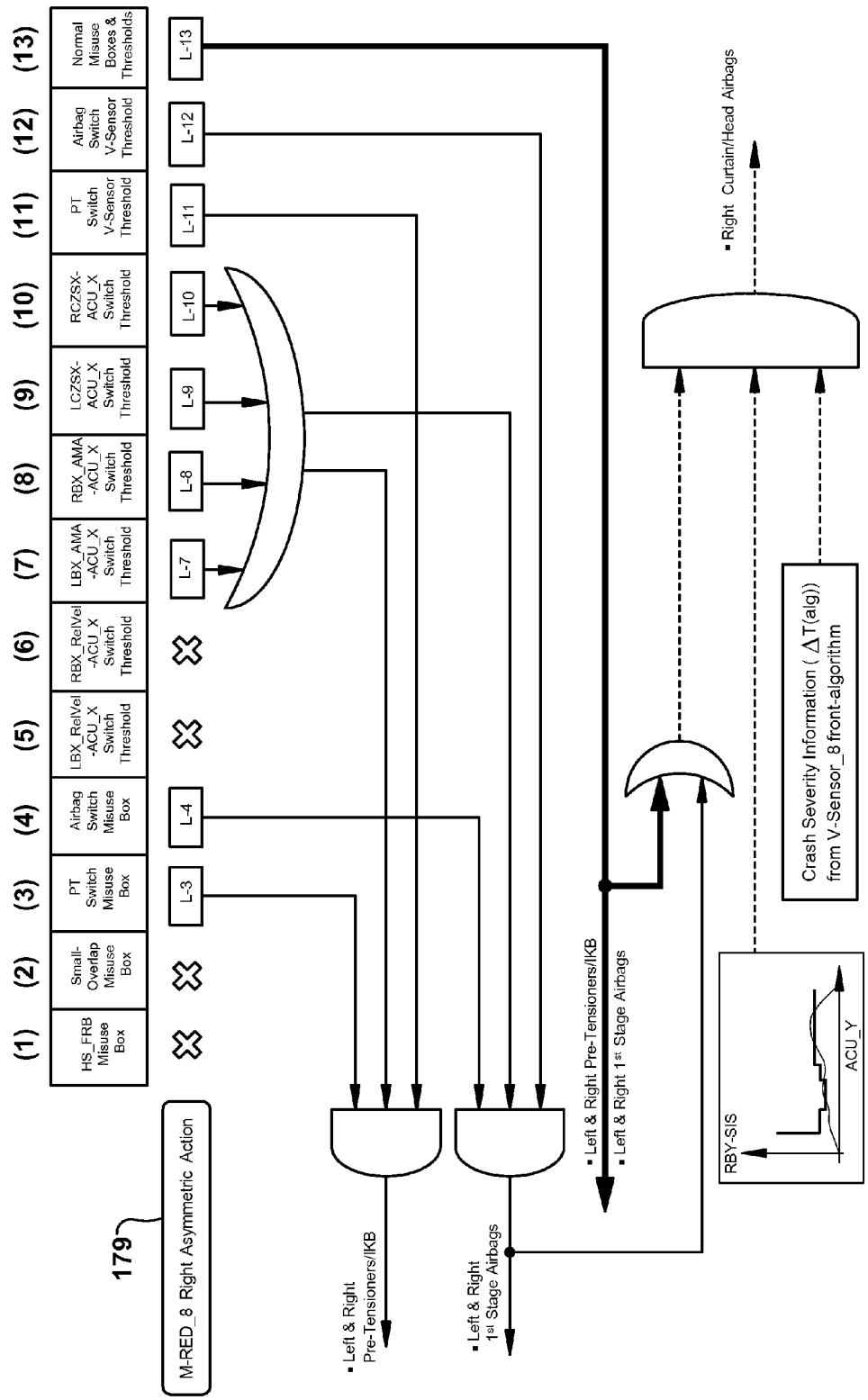
Figure 21:
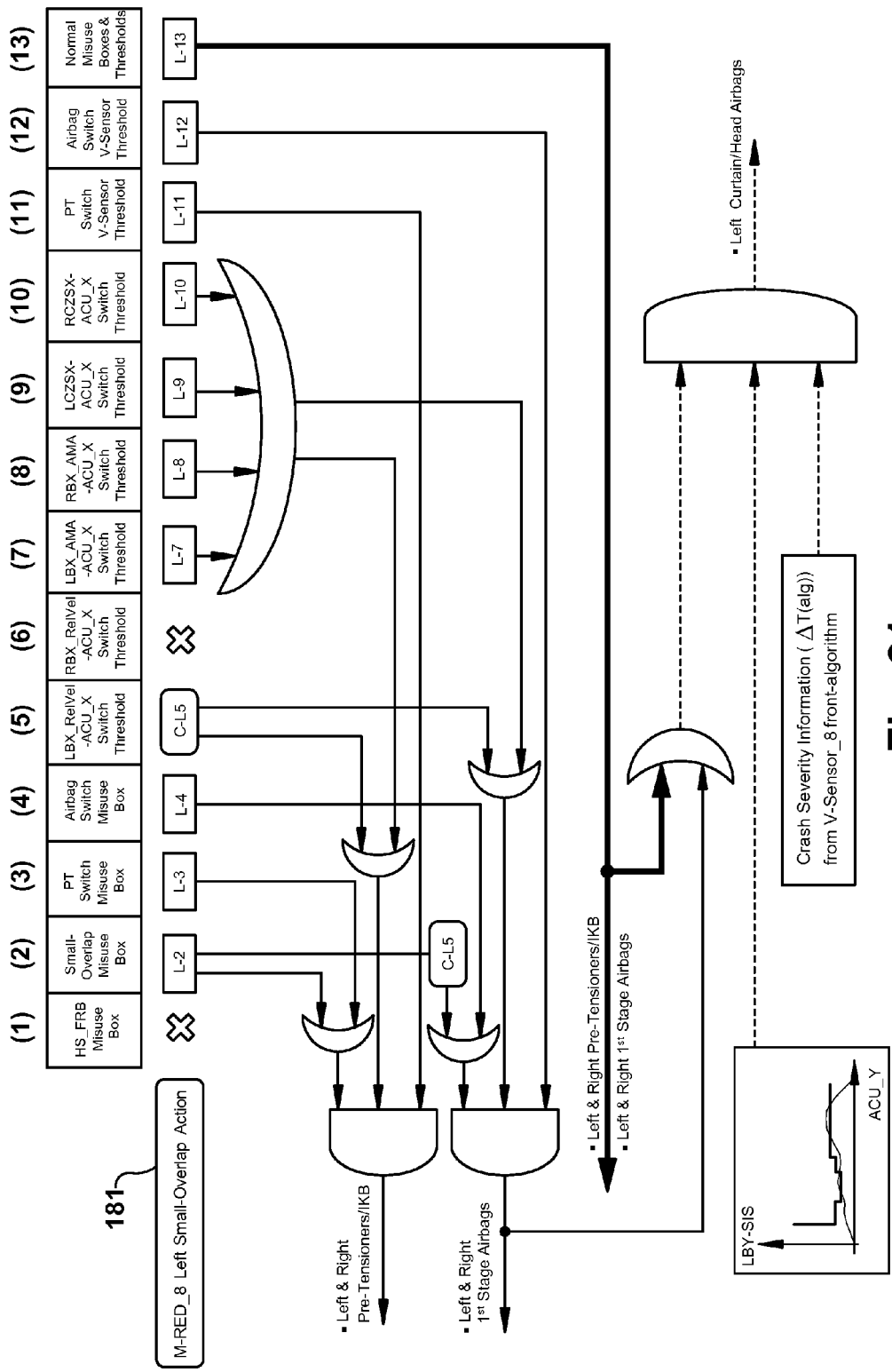
Figure 22:
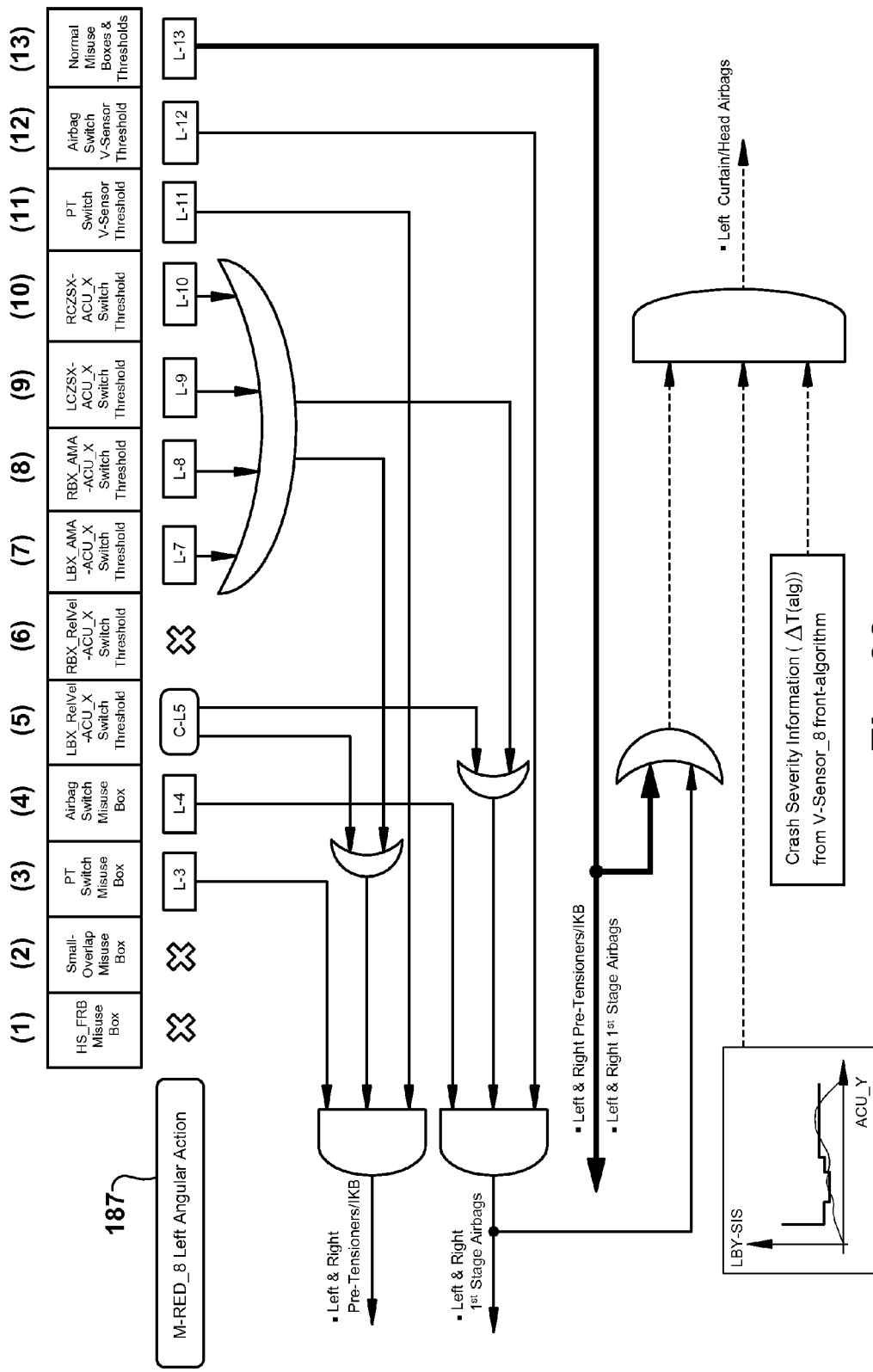
Figure 23:
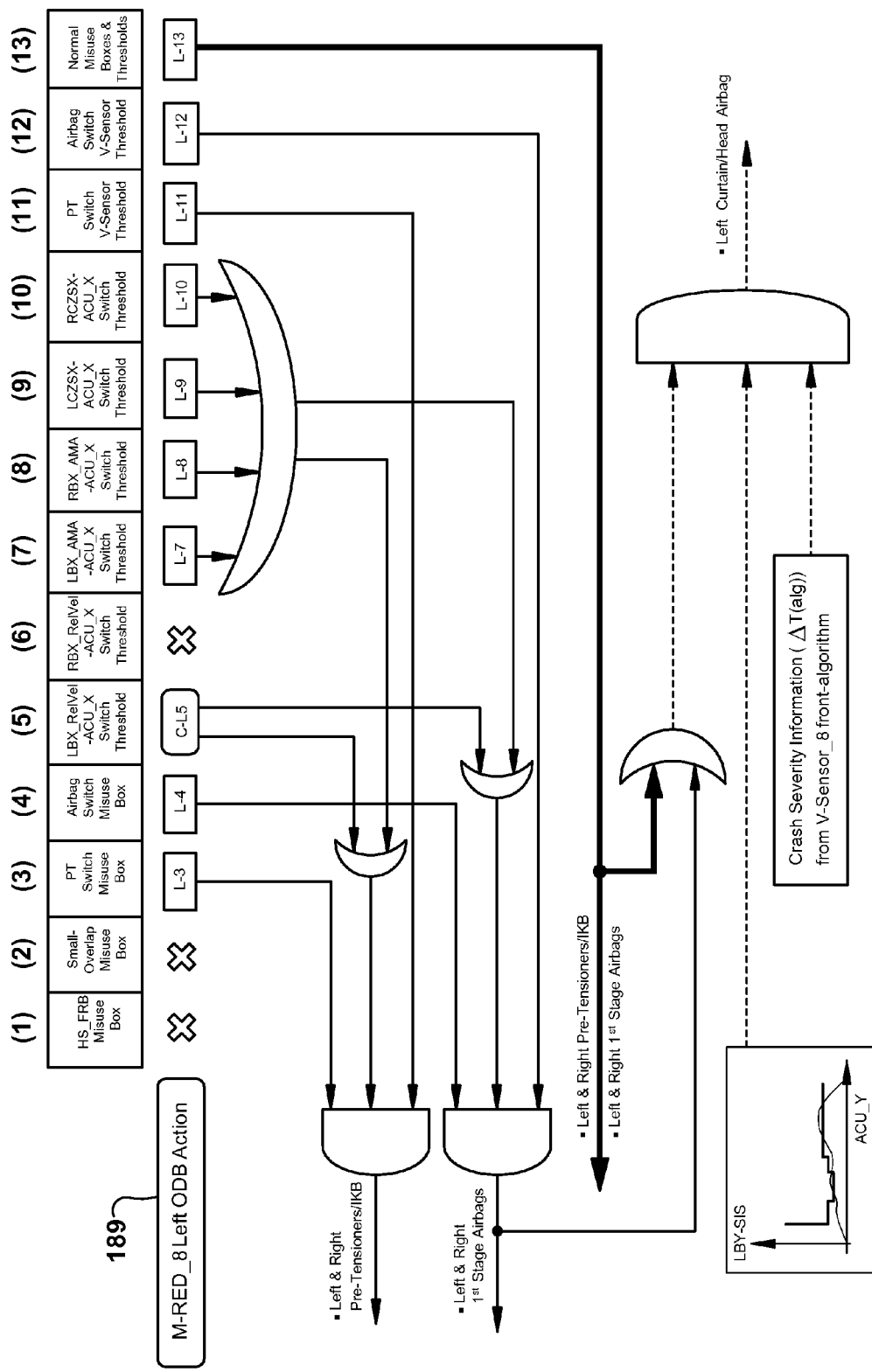
Figure 24:
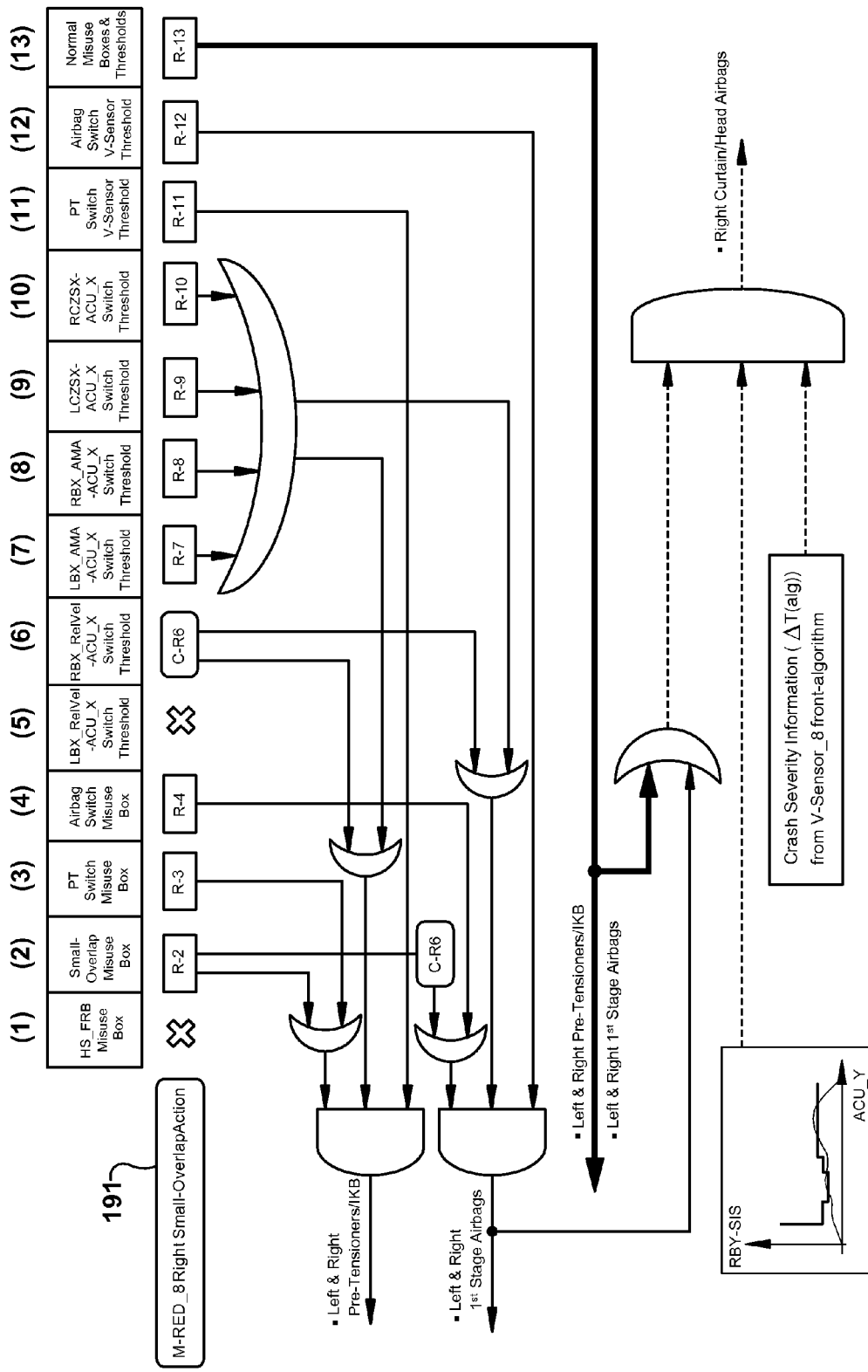
Figure 25:
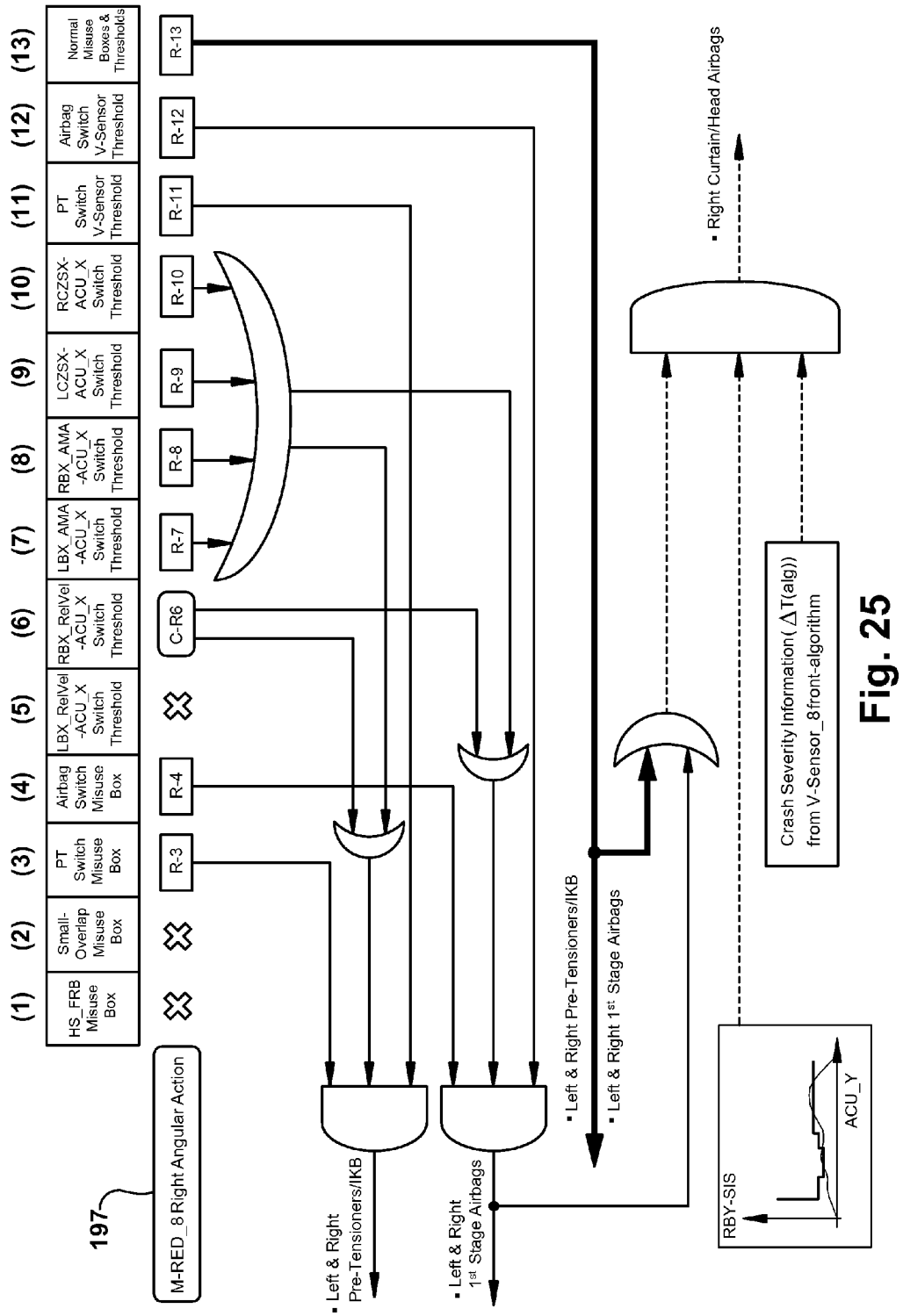
Figure 26:
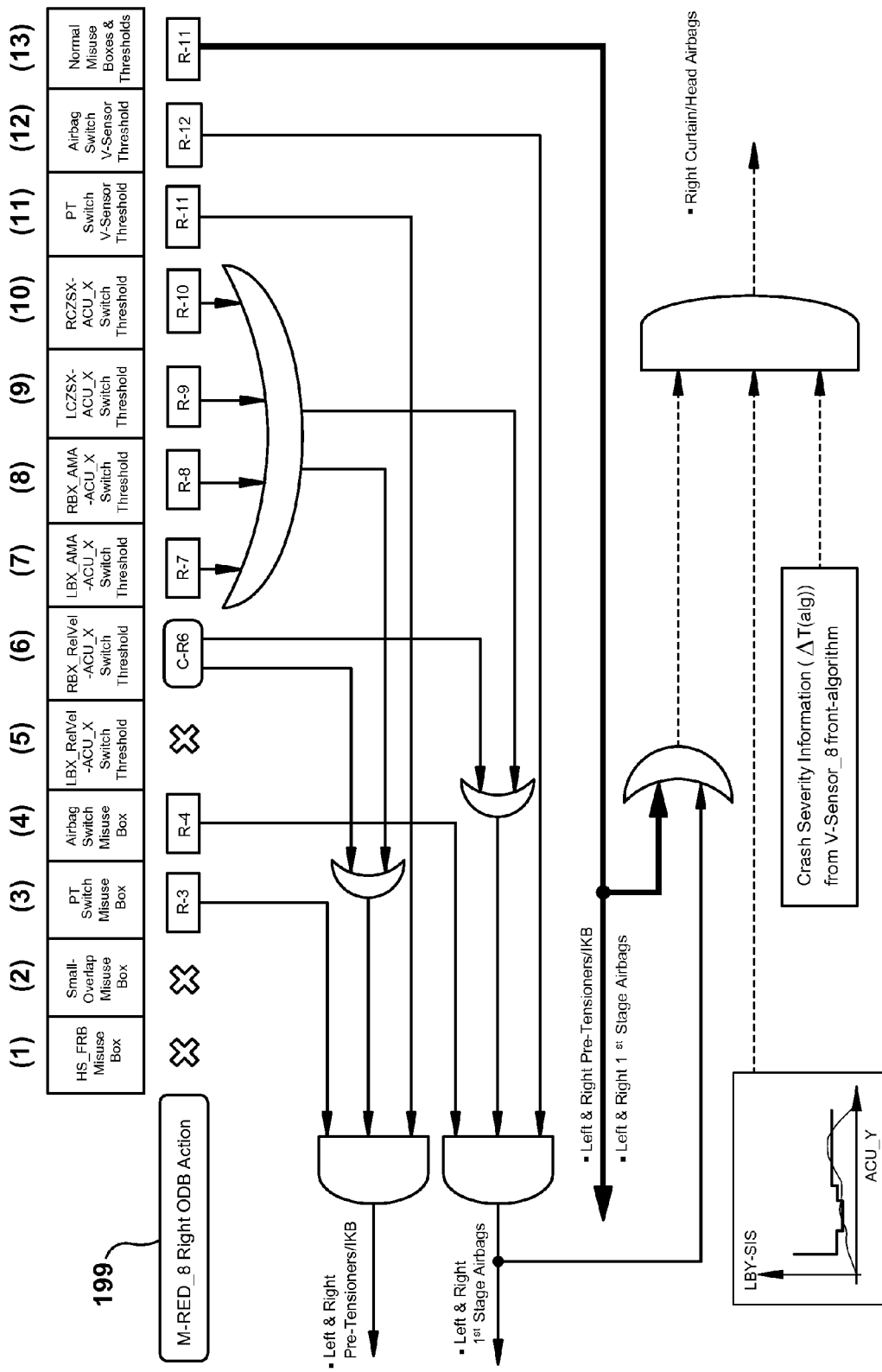

FIG. 20 depicts the control logic for controlling actuation of the restraining devices 24, 30, 32 during an M-RED_8 Right Asymmetric Action event using both the base deployment algorithm and the enhanced deployment algorithm. FIG. 21 depicts the control logic for controlling actuation of the restraining devices 24, 30, 32 for an M-RED_8 Left Small-Overlap Action event using both the base deployment algorithm and the enhanced deployment algorithm. FIG. 22 depicts the control logic for controlling actuation of the restraining devices 24, 30, 32 for an M-RED_8 Left Angular Action event using both the base deployment algorithm and the enhanced deployment algorithm. FIG. 23 depicts the control logic for controlling actuation of the restraining devices 24, 30, 32 for an M-RED_8 Left ODB Action event using both the base deployment algorithm and the enhanced deployment algorithm. FIG. 24 depicts the control logic for controlling actuation of the restraining devices 24, 30, 32 for an M-RED_8 Right Small-Overlap Action event using both the base deployment algorithm and the enhanced deployment algorithm. FIG. 25 depicts the control logic for controlling actuation of the restraining devices 24, 30, 32 during an M-RED_8 Right Angular Action event using both the base deployment algorithm and the enhanced deployment algorithm. FIG. 26 depicts the control logic for controlling actuation of the restraining devices 24, 30, 32 for an M-RED_8 Right ODB Action event using both the base deployment algorithm and the enhanced deployment algorithm.

Those skilled in the art should appreciate that the present invention provides a quicker TTF during certain vehicle crash events by using the enhanced deployment algorithm. In particular, the present invention provides:

(1) A very fast decision/sensing time (time to fire "TTF") for frontal airbags and pretensioners (in the range of 5 ms to 10 ms) for 56-kph FRB & Small/Narrow Overlap Impact events;

(2) A robust and well controlled must-deploy decision of Side Curtain Airbags for Small Overlap impact events, Oblique/Angular, and offset deformable barrier ("ODB") events and a no-deploy decision of the Curtain Airbag for a 56-kph FRB event;

(3) An improved deployment decision timing for ODB impact events; and (4) Improve control of the Seat-belt Load Limiters for all high severity impact events.

From the above description of the invention, those skilled in the art will perceive improvements, changes and modifications. Such improvements, changes, and/or modifications within the skill of the art are intended to be covered by the appended claims.

Having described the invention, the following is claimed:

1. A method for controlling an actuatable restraining device comprising the steps of:
   sensing a plurality of crash event indications;
   classifying crash events in response to comparing the sensed crash event indications against one another to identify at least one of a forward rigid barrier crash event, an offset deformable barrier crash event, an angular crash event, and a small overlap crash event; and
   controlling deployment timing of the actuatable restraining device in response to the classification of the crash event.

2. The method of claim 1 wherein the step of controlling further includes the steps of establishing a logic control switch value table using the classified crash events having a plurality of logic control switch values responsive to the event classifications and using the logic control switch values to reduce deployment timing of the actuatable restraining device.

3. The method of claim 2 wherein each of a plurality of the logic control switch values for at least one classified crash event is determined by comparing the sensed crash event indications against one another and against threshold values.

4. The method of claim 3 wherein each of the plurality of the logic control switch values for at least one classified crash event is determined by plotting the sensed crash event indications as a function of one another and against the threshold values.

5. The method of claim 1 wherein the step of sensing the plurality of crash events includes sensing crash acceleration in the vehicle's longitudinal direction at two opposite remote side locations of the vehicle and wherein the step of classifying crash events compares a first crash velocity value determined from one of the two opposite remote side locations against a second crash velocity value determined from the other of the two opposite remote side locations, the event classification being defined by the result of the comparison.

6. The method of claim 1 wherein the step of sensing the plurality of crash events includes sensing crash acceleration in the vehicle's longitudinal direction at two opposite crush zone locations of the vehicle and wherein the step of classifying crash events compares a first crash velocity value determined from one of the two opposite crush zone locations against a second crash velocity value determined from the other of the two opposite crush zone locations, the event classification being defined by the result of the comparison.

7. The method of claim 1 wherein the step of sensing the plurality of crash events includes sensing crash acceleration in the vehicle's lateral direction and crash acceleration in longitudinal direction at a remote side location of the vehicle and wherein the step of classifying crash events includes determining a crash displacement value from the sensed crash acceleration in the longitudinal direction and comparing the sensed crash acceleration value in the vehicle's lateral direction against the determined crash displacement value in the longitudinal direction, the crash event classification being determined by the result of the comparison.

8. The method of claim 1 wherein the step of sensing the plurality of crash events includes sensing crash acceleration in the vehicle's longitudinal direction at a remote side location of the vehicle and wherein the step of classifying crash events includes determining a crash velocity value and a crash displacement value from the sensed crash acceleration in the longitudinal direction and comparing the determined crash velocity value as a function of the determined crash displacement value, the crash event classification being determined by the result of the comparison.

9. The method of claim 1 wherein the step of classifying crash events comprises classifying crash events in response to comparing the sensed crash event indications against one another.

10. A method for controlling an actuatable restraining device comprising the steps of:
    sensing a plurality of crash event indications;
    classifying crash events in response to comparing the sensed crash event indications against one another to identify a small overlap crash event; and
    controlling deployment timing of the actuatable restraining device in response to the classification of the crash event.

11. The method of claim 10 wherein the step of classifying crash events comprises classifying crash events in response to comparing the sensed crash event indications against one another.

12. A method for controlling an actuatable restraining device comprising the steps of:
    sensing a plurality of crash event indications;
    classifying crash events in response to comparing the sensed crash event indications against one another; and
    controlling deployment timing of the actuatable restraining device in response to the classification of the crash event using a base deployment control algorithm and an enhanced deployment algorithm wherein the enhanced deployment algorithm monitors for a small overlap crash event.

13. The method of claim 12 wherein the step of classifying crash events comprises classifying crash events in response to comparing the sensed crash event indications against one another.

14. An apparatus for controlling an actuatable restraining device comprising:
    a plurality of sensors for sensing a plurality of crash event indications; and
    a controller for classifying crash events in response to comparing the sensed crash event indications against one another to identify at least one of a forward rigid barrier crash event, an offset deformable barrier crash event, an angular crash event, and a small overlap crash event and controlling deployment timing of the actuatable restraining device in response to the classification of the crash event.

15. The apparatus of claim 14 wherein said controller includes a logic control switch value table using the classified crash events having a plurality of logic control switch values responsive to the event classifications, the logic control switch values being used to reduce deployment timing of the actuatable restraining device.

16. The apparatus of claim 15 wherein each of a plurality of the logic control switch values for at least one classified crash event is determined by comparing the sensed crash event indications against one another and against threshold values.

17. The apparatus of claim 16 wherein each of the plurality of the logic control switch values for at least one classified crash event is determined by plotting the sensed crash event indications as a function of one another and against the threshold values.

18. The apparatus of claim 14 wherein the sensors sense crash acceleration in the vehicle's longitudinal direction at two opposite remote side locations of the vehicle and wherein the controller compares a first crash velocity value determined from one of the two opposite remote side locations against a second crash velocity value determined from the other of the two opposite remote side locations, the event classification being defined by the result of the comparison.

19. The apparatus of claim 14 wherein the sensors sense crash acceleration in the vehicle's longitudinal direction at two opposite crush zone locations of the vehicle and wherein the controller compares a first crash velocity value determined from one of the two opposite crush zone locations against a second crash velocity value determined from the other of the two opposite crush zone locations, the event classification being defined by the result of the comparison.

20. The apparatus of claim 14 wherein the sensors sense crash acceleration in the vehicle's lateral direction and crash acceleration in longitudinal direction at a remote side location of the vehicle and wherein the controller determines a crash displacement value from the sensed crash acceleration in the longitudinal direction and comparing the sensed crash acceleration value in the vehicle's lateral direction against the determined crash displacement value in the longitudinal direction, the crash event classification being determined by the result of the comparison.

21. The apparatus of claim 14 wherein the sensors sense crash acceleration in the vehicle's longitudinal direction at a remote side location of the vehicle and wherein the controller determines a crash velocity value and a crash displacement value from the sensed crash acceleration in the longitudinal direction and comparing the determined crash velocity value as a function of the determined crash displacement value, the crash event classification being determined by the result of the comparison.

22. The apparatus of claim 14 wherein the controller classifies crash events in response to comparing the sensed crash event indications against one another.

23. An apparatus for controlling an actuatable restraining device comprising:
   a plurality of sensors for sensing a plurality of crash event indications; and
   a controller for classifying crash events in response to comparing the sensed crash event indications against one another to identify a small overlap crash event and controlling deployment timing of the actuatable restraining device in response to the classification of the crash event.

24. The apparatus of claim 23 wherein the controller classifies crash events in response to comparing the sensed crash event indications against one another.

25. An apparatus for controlling an actuatable restraining device comprising:
   a plurality of sensors for sensing a plurality of crash event indications; and
   a controller for controlling the actuatable restraining device in response to comparing the sensed crash event indications against one another, said controller including a base deployment algorithm for controlling the actuatable restraining device in response to comparing the sensed crash event indications against one another and further including an enhanced deployment algorithm for comparing the sensed crash event indications against one another to classify crash events indications to determine if a small overlap crash event is occurring, said enhanced deployment algorithm decreasing timing of the actuation of the restraining device relative to control provided by the base deployment algorithm when a small overlap crash event is classified.

26. The apparatus of claim 25 wherein said plurality of sensors includes crush zone acceleration sensors mounted in a forward crush zone are of the vehicle and remote located side acceleration sensors mounted in opposite located side structures of the vehicle.

27. The apparatus of claim 26 wherein the crush zone acceleration sensors and the remote located side acceleration sensors are all multi-axis acceleration sensors capable of measuring acceleration in a longitudinal axis of the vehicle and a lateral axis of the vehicle.

28. The apparatus of claim 25 wherein the controller controls the actuatable restraining device in response to comparing the sensed crash event indications against one another.

* * * * *